United States Patent [19]
Asano et al.

[11] Patent Number: 5,621,839
[45] Date of Patent: Apr. 15, 1997

[54] OPTICAL WAVEGUIDE DEVICE HAVING SUBSTRATE MADE OF FERROELECTRIC CRYSTALS

[75] Inventors: Masato Asano, Nagoya; Tetsuya Ejiri, Kasugai, both of Japan

[73] Assignee: NGK Insulators, Ltd., Japan

[21] Appl. No.: 294,915

[22] Filed: Aug. 24, 1994

[30] Foreign Application Priority Data

| Aug. 26, 1993 | [JP] | Japan | 5-211606 |
| Sep. 6, 1993 | [JP] | Japan | 5-221038 |
| Aug. 1, 1994 | [JP] | Japan | 6-180102 |
| Aug. 2, 1994 | [JP] | Japan | 6-181527 |

[51] Int. Cl.$^6$ .................................................. G02B 6/10
[52] U.S. Cl. ........................... 385/129; 385/130; 385/9
[58] Field of Search ................................. 385/129, 8, 9, 385/14, 45, 130, 131, 132; 359/181, 245

[56] References Cited

U.S. PATENT DOCUMENTS

| 5,185,823 | 2/1993 | Kaku et al. ............................ 385/2 |
| 5,359,449 | 10/1994 | Nishimoto et al. ................... 385/9 X |

FOREIGN PATENT DOCUMENTS

| 0490387 | 6/1992 | European Pat. Off. ......... G02F 1/035 |
| 5-88125 | 4/1993 | Japan ................................ G02F 1/035 |

OTHER PUBLICATIONS

Patent Abstracts of Japan, vol. 010, No. 135 (P-457) May 20, 1986 & JP-A-60 257325 (Yokokawa Hokushin Denki KK) Dec. 19, 1985.

Patent Abstracts of Japan, vol. 016, No. 345 (P-1392) Jul. 27, 1992 & JP-A-04 104221 (Japan Aviation Electron Ind Ltd) Apr. 6, 1992.

Patent Abstracts of Japan, vol. 015, No. 011 (P-1150) Jan. 10, 1991 & JP-A-02 257108 (NEC Corp.) Oct. 17, 1990.

C. H. Bulmer et al., Appl. Phys. Lett. 48 (16) 21 Apr. 1986, pp. 1036–1038 "Pyroelectric effects in LiNbO$_3$ channel-waveguide devices".

G. E. Betts et al., SPIE vol. 1794, Integrated Optical Circuits II (1982), pp. 376–381 "Optical Modulators for Analog Link Applications".

A. S. Greenblatt et al., PSAA—III Technical Program, The Third Annual DARPA Symposium on Photonics Systems for Antenna Applications, Jan. 20, 21, and 22, 1993, "Temperature Stability of Packaged Linear Modulators in LiNbO$_3$".

Primary Examiner—John D. Lee
Assistant Examiner—Phan T. H. Palmer
Attorney, Agent, or Firm—Parkhurst, Wendel & Rossi

[57] ABSTRACT

In order not to vary a light dividing ratio, a light insertion loss and a light extinction ratio, even if an environmental temperature is varied, in a first aspect, an optical waveguide device has at least one optical waveguide substrate made of ferroelectric crystals, an optical waveguide formed in the optical waveguide substrate, a first crystal plane formed in the optical waveguide substrate in which charges of one polarity are generated due to pyroelectrical effects, a second crystal plane made of ferroelectrical crystals in which charges of the other polarity are generated, a first conductive layer formed on the first crystal plane, and a second conductive layer formed on the second crystal plane, wherein the first conductive layer is connected electrically to the first conductive layer.

14 Claims, 21 Drawing Sheets

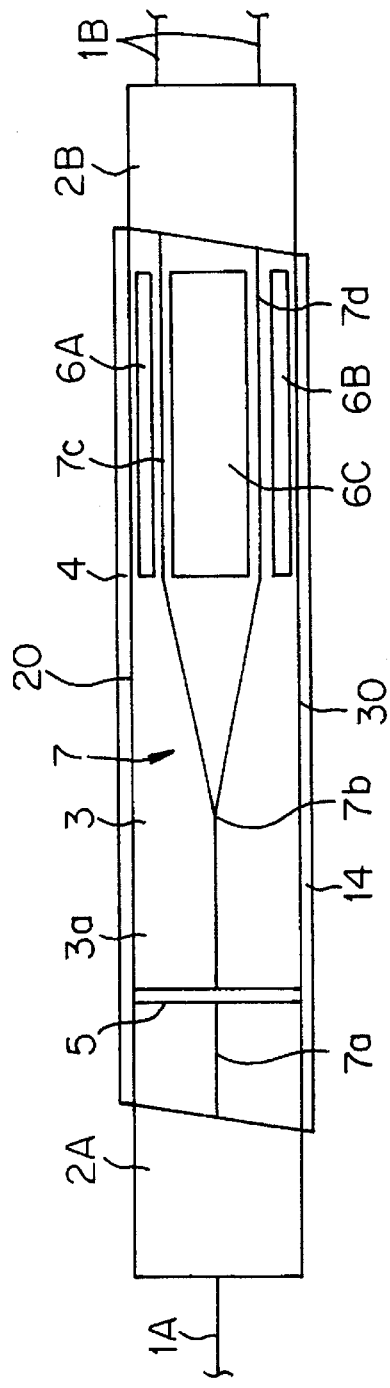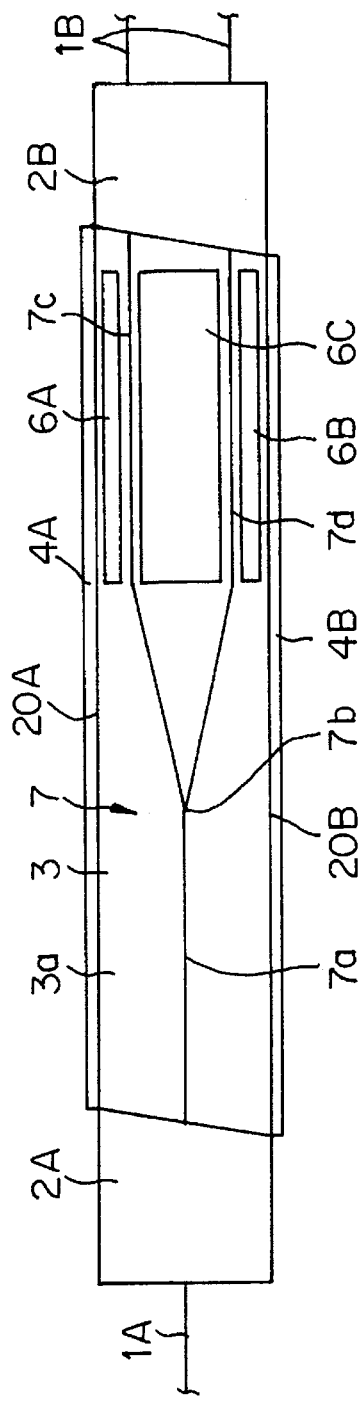

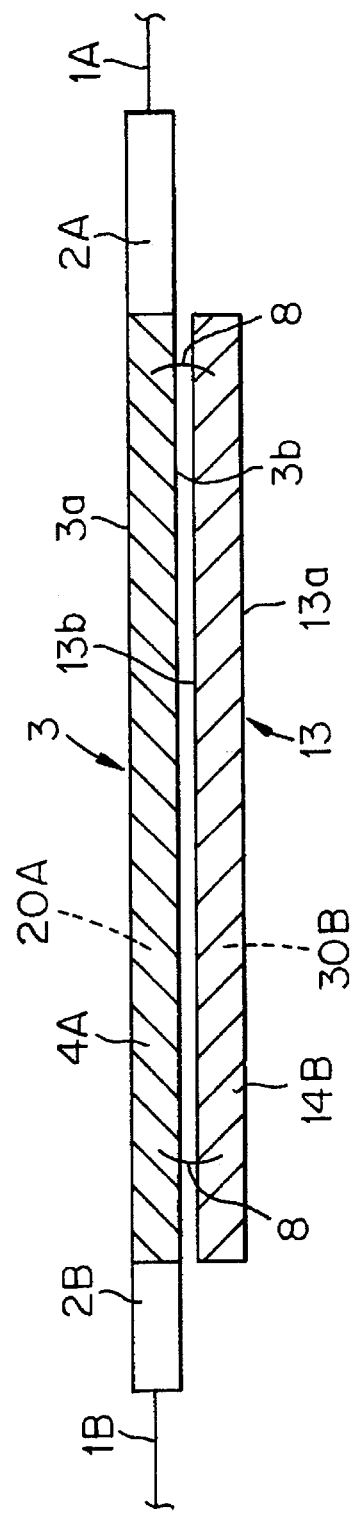
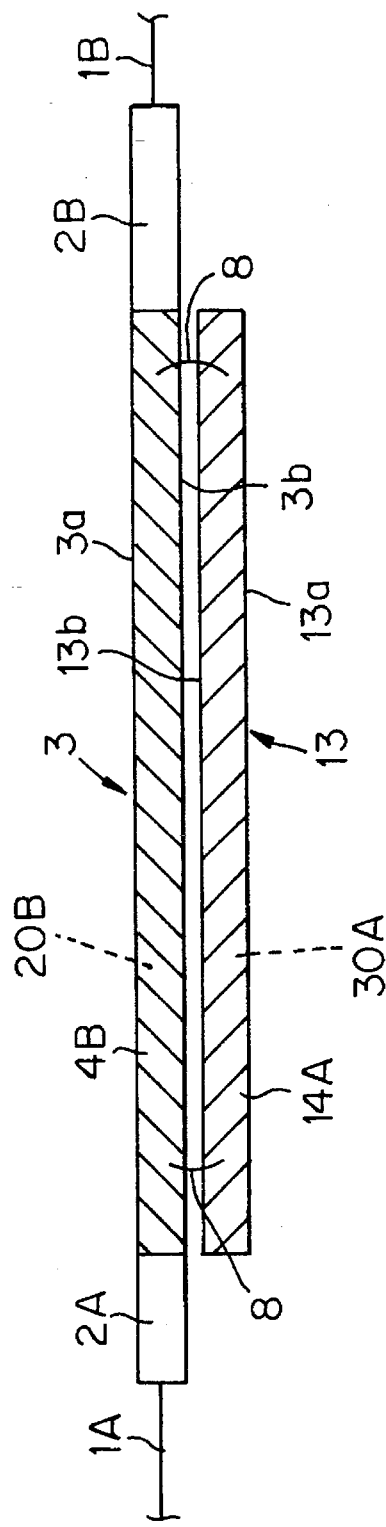

OPTICAL WAVEGUIDE DEVICE HAVING SUBSTRATE MADE OF FERROELECTRIC CRYSTALS

BACKGROUND OF THE INVENTION

1. Field of the Invention

The present invention relates to optical waveguide devices comprising an optical waveguide substrate made of ferroelectric crystals.

2. Description of the Related Art

In the fields of optical measurement systems, optical communication systems, etc., it is known to manufacture optical waveguide devices by forming three dimensional optical waveguides in various electro-optics crystals.

As for the optical waveguide devices, optical branch devices, optical modulation devices, optical polarization devices, optical switches, multiplexers, and so on are known. The optical waveguide devices have such advantages as small in size, good stability, low necessary power and high speed signal transmission.

The inventors investigated the use of the optical waveguide device, which is manufactured by forming the three-dimensional optical waveguide of Y-branch type in the substrate made of $LiNbO_3$, as a modulator for fiber optic gyroscopes. In this modulator, light impinging upon one end of the optical waveguide is divided by a ratio of 50:50% at a branch portion of the optical waveguide. One portion of the divided light is phase-modulated by applying a predetermined voltage. Phase differences due to Sagnac effects, which are generated by a rotation of the objected optical systems, are detected by the optical waveguide device. The thus obtained phase difference is introduced into a formula showing the relation between a rotation angular rate of the optical system and a phase difference to obtain a rotation angular rate.

The inventors further investigated an intensity modulator of Mach-Zehnder type formed by arranging an optical waveguide of Mach-Zehnder type in the substrate. In this intensity modulator, a light impinging upon the intensity modulator is portions of the divided. Respective divided lights are phase-modulated by applying a voltage thereto. Then, the portions of modulated light are interfered to vary the intensity.

During these investigations, the inventors faced problems mentioned below. In the modulator for fiber optic gyroscope, it is necessary to set the dividing ratio substantially equal to 50:50. However, especially in the modulator for fiber optic gyroscope, an admission range of the dividing ratio is very narrow. This is because, in the case that the dividing ratio is out of 50:50, the detected rotation angular rate is largely varied even if the rotation rate of the optical system is not varied.

For example, if it is assumed that the dividing ratio is temporarily varied from 50:50 to 40:60, the obtained rotation angular rate is varied about 20%. Therefore, in the modulator for fiber optic gyroscope, it is required to set the dividing ratio within 48:52~50:50. Moreover, the optical waveguide device is principally required to act stably along a wide temperature range. However, if an environmental temperature of the optical waveguide device was varied, the dividing ratio at the branch portion of the optical waveguide was temporarily varied largely. As a result, the dividing ratio of 50:50 was varied to 30:70, especially to substantially 100:0. Moreover, in addition to the light dividing ratio variation, a light insertion loss of the optical waveguide device occurred.

Further, in the Mach-Zehnder intensity modulator, if the light dividing ratio was varied, an extinction ratio is varied largely, and the light insertion loss of the overall optical waveguide device is temporarily increased at the same time.

SUMMARY OF THE INVENTION

It is an object of the invention to provide an optical waveguide device comprising an optical waveguide substrate made of ferroelectric crystals, and an optical waveguide formed in the optical waveguide substrate, an output end of the optical waveguide being divided into a plurality of rows, in which, a light dividing ratio and a light insertion loss are not varied, even if an environmental temperature of the optical waveguide device is varied.

According to a first aspect of the invention, an optical waveguide device comprises at least one optical waveguide substrate made of ferroelectric crystals, an optical waveguide formed in said optical waveguide substrate, a first crystal plane formed in said optical waveguide substrate in which charges of one polarity are generated due to pyroelectrical effects, a second crystal plane made of ferroelectrical crystals in which charges of the other polarity are generated, a first conductive layer formed on said first crystal plane, and a second conductive layer formed on said second crystal plane, wherein said first conductive layer is conducted electrically to said second conductive layer.

It is another object of the invention to provide an optical waveguide device comprising an optical waveguide substrate made of ferroelectric crystals, and an optical waveguide formed in a principal plane of the optical waveguide substrate, at least one functional portion for a light dividing or a light coupling being formed in the light waveguide, in which, a light insertion loss, a light dividing ratio and an extinction ratio are not varied, even if an environmental temperature of the optical waveguide device is varied.

According to a second aspect of the invention, an optical waveguide device comprises an optical waveguide substrate made of ferroelectric crystals whose spontaneous electric polarization direction is crossed with respect to a light proceeding direction, an optical waveguide formed in a major plane of said optical waveguide substrate, at least one functional portion for dividing or coupling lights arranged in said optical waveguide, a first crystal plane formed in said optical waveguide substrate in which charges of one polarity are generated due to pyroelectrical effects, a second crystal plane formed in said optical waveguide substrate in which charges of the other polarity are generated, a first conductive layer formed in one region defined from a boundary between said first crystal plane and said major plane to said functional portion, and a second conductive layer formed in the other region defined from a boundary between said second crystal plane and said major plane to said functional portion, wherein said first conductive layer and said second conductive layer are electrically conducted.

In the construction mentioned above, the inventors investigated the reason for varying the light dividing ratio at the branch portion of the light waveguide (first aspect of the invention) and the reason for varying the light insertion loss, the light dividing ratio and the extinction ratio at the functional portion of the light waveguide (second aspect of the invention).

As a result, we found that these reasons were due to pyroelectrical effects generated by a variation of the environmental temperature. That is to say, the pyroelectrical effects function to generate a large number of charges in a crystal plane of the optical waveguide substrate in a spontaneous electric polarization direction, and electric fields due to the charges were largely interfered to a light transmission at the branch portion (first aspect of the invention) and at the functional portions (second aspect of the invention).

Moreover, in the first aspect of the invention, the first low resistivity layer was formed in the first crystal plane which generates the pyroelectrical effects in the optical waveguide substrate, and the second low resistivity layer was also formed in the second crystal plane which generates charges having an opposite polarity with respect to the charges generated in the first crystal plane. Then, the first low resistivity layer of the first crystal plane and the second low resistivity layer of the second crystal plane were electrically connected. As a result, we found that a variation of the light dividing ratio was eliminated almost perfectly. In addition, a variation of the light insertion loss was eliminated almost perfectly. We think this is because the charges generated in the first crystal plane due to the environmental temperature variation are neutralized instantaneously by the charges generated in the second crystal plane, and thus charges affected to the branch portion of the optical waveguide are not generated.

Further, in the second aspect of the invention, the first conductive layer was formed in one region defined from a boundary between the first crystal plane and the major plane to the functional portion, and the second conductive layer was formed in the other region defined from a boundary between the second crystal plane and the major plane to the functional portion. Then, the first conductive layer and the second conductive layer were electrically connected. As a result, we found that variations of the light insertion loss, the light dividing ratio and the extinction ratio were extraordinarily reduced.

The reason for reducing the variations mentioned above is not obvious. However, in this case, the conductive layers are arranged in the regions defined from the functional portions of the optical waveguide to respective crystal planes in which the charges are generated due to the pyroelectrical effects. Therefore, if the charges are generated in respective crystal planes, lines of electric force become coarse near the conductive layers, and thus a potential gradient between the conductive layers becomes small accordingly. Therefore, we think that the pyroelectrical effects to the functional portions become small. Moreover, since the first conductive layer and the second conductive layer are electrically connected, potentials of respective conductive layers arranged to both side portions of the functional portion become almost equal, and thus the pyroelectrical effects can be reduced.

In the second aspect of the invention, no conductive layers are formed to both of the first crystal plane and the second crystal plane in which the charges are directly generated, and the charges instantaneously generated in the crystal planes are not neutralized. However, according to the second aspect of the invention, even if the charges generated in the crystal planes are not directly neutralized, it is possible to prevent the affections instantaneously applied to the functional portions at which a light is divided.

As for the pyroelectrical effects, in the Japanese Patent Laid-open Publication No. 5-88125, a buffer layer is formed on a surface of an optical waveguide, and an antistatic layer is formed on the buffer layer. Moreover, a control electrode is formed on the antistatic layer. However, in this invention, the charges generated by the pyroelectrical effects are deviated ununiformly in the crystal surface due to an effect of the control electrode. The antistatic layer only prevents the charge ununiformity, and does not function to neutralize instantaneously the charges generated by the pyroelectrical effects. Further, the optical waveguide has a linear shape, and thus there is no problem about a variation of the light dividing ratio.

Moreover, in the Japanese Patent Laid-open Publication No. 2-257108, a pair of ferroelectric substrates are connected via a conductive member in such a manner that respective spontaneous electric polarization are reversed with each other so as to reduce the pyroelectrical effects. However, in this invention, the charges generated in connection surfaces of the ferroelectric substrates can be neutralized, but the charges generated in the other surfaces than the connection surfaces cannot be neutralized. Therefore, electric fields remain in the ferroelectric substrates, and thus the pyroelectrical effects cannot be eliminated. Further, the optical waveguide has a linear shape, and thus there is no problem about a variation of the light dividing ratio.

BRIEF DESCRIPTION OF THE DRAWINGS

FIG. 1 is a plan view showing one embodiment of an optical waveguide device according to the first aspect of the invention;

FIG. 2 is a plan view illustrating another embodiment of the optical waveguide device according to the first aspect of the invention;

FIGS. 3a and 3b are side views respectively depicting the optical waveguide device shown in FIG. 2;

FIG. 5b is a cross sectional view cut along Vb—Vb line in FIG. 5a;

FIG. 6b is a cross sectional view cut along VIb—VIb line in FIG. 6a;

FIG. 8b is a cross sectional view cut long VIIIb—VIIIb line in FIG. 8a;

DESCRIPTION OF THE PREFERRED EMBODIMENTS

Figure 4:
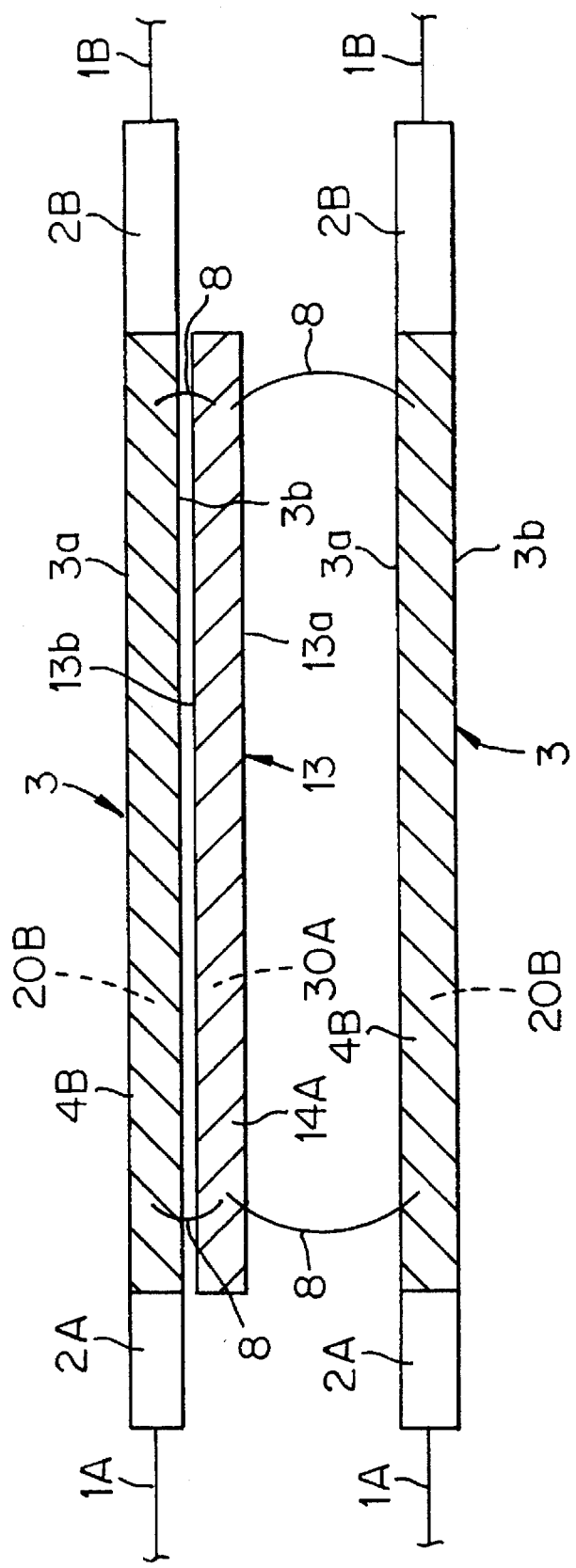
FIG. 4 is a side view showing another embodiment of the optical waveguide device according to the first aspect of the invention.

Hereinafter, the first aspect of the invention and the second aspect of the invention will be explained in this order.

In the first aspect of the invention, an optical waveguide device comprises an optical waveguide device, a first conductive layer formed in a first crystal plane of the optical waveguide device, and a second conductive layer formed in a second crystal plane of the optical waveguide device. The first conductive layer and the second conductive layer are electrically connected so as to especially eliminate a variation of a light dividing ratio of the optical waveguide device. In this case, the electrical connection between the first conductive layer and the second conductive layer is preferably performed in one of the following methods.

(1) When control electrodes are formed on a surface (optical waveguide forming side) of the optical waveguide substrate, conduction patterns for the electrical connection are formed thereon at the same time. According to this method, the conduction patterns can be formed at the same time when the control electrodes are formed by a screen printing method or a vapor deposition method, and thus the electrical connection can be performed simply. However, in this method, the conduction patterns become sometimes a cause of a light insertion loss of the optical waveguide.

(2) On one of two major planes of the optical waveguide substrate, the first conductive layer and the second conductive layer are connected by means of wires.

(3) On a major plane on which no optical waveguide is formed, conduction patterns for the electrical conduction are formed by a screen printing method or a vapor method. In this case, there is no possibility to affect the optical waveguide. However, in order to form the conduction patterns, it is necessary to perform the screen printing or the vapor deposition once more after the control electrodes are formed on one major plane. Therefore, the manufacturing steps become increased, and the manufacturing cost becomes expensive.

Moreover, in the first aspect of the invention, a dummy substrate made of ferroelectric crystals is formed apart from the optical waveguide substrate, and the second crystal plane is arranged in the dummy substrate. In this case, the following effects can be obtained.

In this case, since the conduction patterns are not formed on the optical waveguide, the conduction patterns do not affect the optical waveguide. Moreover, it is not necessary to increase the manufacturing steps, as compared with the case such that the conduction patterns are formed on the reverse major plane on which no optical waveguide is formed. This is because, since both of the conductive layer in the dummy substrate and the conductive layer in the optical waveguide substrate are formed to side planes perpendicular to the major plane in which the pyroelectrical effects occur, the conductive layers can be formed at the same time in the same vapor apparatus or in the same printing apparatus.

In this case, it is preferred to stack the optical waveguide substrate and the dummy substrate, in such a manner that the first crystal plane and the second crystal plane are aligned in the same side, and to form the conductive layers in the first crystal plane and the second crystal plane continuously. If the conductive layers are formed integrally in this manner, the forming step of the conductive layer can be performed under the same condition, and thus a large scale manufacturing an be performed. Further, if the dummy substrate and the optical waveguide substrate are integrated in this manner, the following effects can be obtained.

In an actual use, the optical waveguide substrate is fixed to a package having predetermined dimensions, and the package is used as optical devices. In this case, in case that the optical waveguide substrate is fixed directly to the package by means of adhesives etc., if the environmental temperature is varied, a stress is applied to the optical waveguide substrate via the adhesive layer, and the characteristics of the optical waveguide are varied accordingly due to the applied stress. This problem can be eliminated by integrating the dummy substrate and the optical waveguide substrate and fixing the dummy substrate to the package.

Moreover, the effects mentioned above can be obtained in the optical waveguide device having a plurality of optical waveguide substrates by connecting electrically respective first crystal planes of the optical waveguide substrates to the second crystal plane of one dummy substrate. In this case, it is possible to decrease the number of dummy substrates.

Further, it is possible to stack the dummy substrate between two optical waveguide substrates, in such a manner that respective first crystal planes and the second crystal planes are aligned in the same side, and to form the conductive layers in respective first crystal planes and the second crystal plane continuously. In this case, it is possible to stack more number of optical waveguide substrates and dummy substrates alternately.

As mentioned above, in the case that the conductive layer is formed continuously in the optical waveguide substrates and the dummy substrates, it is preferred to arrange the adhesive layers between the optical waveguide substrates and the dummy substrates. In this case, since the adhesive force between the optical waveguide substrate and the dummy substrate can be made larger, the conductive layers can be formed easily. Especially, in the case that the conductive layer is formed by the vapor deposition method, since the conductive layer does not function to fix the optical waveguide substrate and the dummy substrate with each other, it is necessary to arrange the adhesive layer between the optical waveguide substrate and the dummy substrate.

Moreover, in the case that the integrated conductive layer is formed by arranging a conductive paste on the optical waveguide substrate and the dummy substrate and firing the conductive paste, if a thickness of the conductive paste is made thick, the connection and integration between the optical waveguide substrate and the dummy substrate can be performed by the conductive layers.

Further, in the first aspect of the invention, it is possible to arrange a plurality of optical waveguide substrates without using the dummy substrates mentioned above and to electrically connect the first crystal plane of one optical waveguide substrate to the second crystal plane of the other optical waveguide substrate. In this case, the same effects as those of the case using the dummy substrate can be obtained. Further, since it is not necessary to use the dummy substrate which does not function as the optical device, it is a preferred embodiment.

In this case, it is possible to connect electrically a first conductive layer formed in the first crystal plane to a second conductive layer formed in the second crystal plane. This electrical connection is performed by wires etc.

Moreover, it is possible to stack a plurality of optical waveguide substrates, in such a manner that the first crystal plane and the second crystal plane are aligned in the same side, and to form the conductive layers on the first crystal planes and on the second crystal planes, respectively and continuously. The effects of the above construction have been explained. In this case, it is possible to arrange the adhesive layer between the optical waveguide substrates. Further, as mentioned above, a plurality of optical waveguide substrates can be connected by means of the first paste.

In the case that the connection and integration between the optical waveguide substrate and the dummy substrate or the connection and integration between a plurality of optical waveguide substrates is performed by the adhesive layer or the fired paste, the following effects can be obtained.

That is to say, when optical fibers are connected to the optical waveguide substrate, it is necessary to connect respective optical waveguide substrates to an optical fiber support substrate as mentioned below. However, since the thickness of the optical waveguide substrate is about 1 mm, and handling during the assembling operation is very severe, it is necessary to perform the assembling operation most carefully. In this case, if the connection and integration between the optical waveguide substrate and the other optical waveguide substrate or the dummy substrate is performed as mentioned above, the overall thickness become more than twice as compared with the thickness of the optical waveguide substrate, and thus the handling becomes easier.

As for ferroelectric crystals, it is preferred to use one or more ferroelectric crystals selected from the group consisting of $LiNbO_3$, $LiTaO_3$, $Li(Nb_x, Ta_{1-x})$, $BaTiO_3$, $ZnO$, $NH_4H_2PO_4$, $KH_2PO_4$ and $KTiOPO_4$. Moreover, it is more preferred to use one or more ferroelectric crystal selected from $LiNbO_3$, $LiTaO_3$ and $Li(Nb_x, Ta_{1-x})$. As for the optical waveguide, it is preferred to use (1) optical waveguide formed by thermally diffusing titanium or copper into ferroelectric crystal, or (2) optical waveguide formed by proton-exchange process in which lithium atom in $LiNbO_3$ crystal, $LiTaO_3$ crystal or $Li(Nb_x, Ta_{1-x}) O_3$ crystal is exchanged by hydrogen atom. In addition, the present invention can be applied to optical waveguides of ridge type, optical waveguides of dielectric load type, optical waveguide of metal load type, etc.

In the optical waveguide device according to the first aspect of the invention, the optical waveguide is divided into a plurality of rows at an output side of the optical waveguide substrate. A shape of the optical waveguide may be planar or may be curved. A branch portion of the optical waveguide may be so-called Y-branch. In this case, one row of the optical waveguide in an input side is coupled with two rows of optical waveguides in an output side, at the branch portion of these optical waveguides.

Moreover, the branch portion of the optical waveguide may be formed as a so-called directional coupler. The directional coupler is formed by arranging adjacent optical waveguides very closely and functions to shift a guided light from one optical waveguide to the other optical waveguide. Therefore, a guided light can be divided by the directional coupler. Moreover, the directional coupler can be used together with the Y-branch.

The optical waveguide devices according to the first aspect of the invention can be used for active devices and passive devices. As for the passive devices, use is made of beam splitters, star couplers having a waveguide of cascade type consisting of a plurality of Y-branch portions, and so on. As for the active devices, use is made of phase modulators, optical switching device, acoustic-optics devices, logic devices for optical computers (AND element, OR element), multiple modulators having such a construction that optical modulation electrodes are arranged to the star coupler, and so on.

Especially in the optical modulators for the fiber optic gyroscope, if the light dividing ratio of the divided light is out of the predetermined value, the rotation rate of the optical system to be measured is extraordinarily varied, and thus it is not possible to measure the precise values. Therefore, the optical waveguide devices according to the first aspect of the invention can be preferably used for the above-mentioned aims.

Moreover, also in the optical waveguide devices for dividing light such as the beam splitters, the optical switching devices, the logic devices, and so on, they output erroneous values if the divided lights are varied. Therefore, the first aspect of the invention can be preferably applied for such devices. Especially in the optical switching devices and the logic devices, ON-OFF states are detected from the divided light transmitted through two rows of optical waveguides. Therefore, if the divided light is varied over the threshold level, the ON state and the OFF state are exchanged, and thus it is not possible to use them.

Further, in the star couplers and the multiple modulators, a plurality of Y-branch portions are arranged to make the cascade construction. Therefore, if the light dividing ratio of respective Y-branch portions is varied out of the predetermined value, these variations are multiplied from input to output. Therefore, even if the variation of the light dividing ratio at one Y-branch portion is for example 5%, the multiplied variations become extraordinarily large value. The first aspect of the invention can be preferably applied to the star couplers and the multiple modulators.

As for the formation of the conductive layers according to the first aspect of the invention, use is made of the following.

(1) By means of the vapor deposition method, a thin layer made of semiconductors or metals such as indium oxide, indium oxide-tin oxide, copper oxide, Si/Ge, and so on is formed.
(2) On the crystal plane, a paste layer including semiconductors or metals such as indium oxide, indium oxide-tin oxide, copper oxide, Si/Ge, and so on is arranged, and the arranged paste layer is fired.
(3) By performing a plasma treatment or an oxidizing treatment with respect to the crystal plane, a crystal structure of the crystal plane is deteriorated to form the conductive layer.
(4) A thin layer made of semiconductors or metals having conductive properties and light shielding properties such as carbon black, graphite, and so on is formed. The thin layer is formed by arranging a paste layer including carbon black or carbon on the crystal plane and firing the paste layer.

in the case that the first conductive layer and the second connected layer are connected electrically, if a resistivity of the connected portion is large, it is not possible to neutralize the charges generated in the first crystal plane quickly. Therefore, a resistivity R of the connected portion should be set in such a manner that electric fields applied to the optical waveguide portion is always below 10 V/cm under thinkable temperature variation rate.

Under various temperature condition, a voltage V applied to the optical waveguide portion due to the pyroelectrical effects is obtained from the following formula.

$$V=QR/d$$

where, Q is the charges (coulomb) generated during a unit time, which depends on the environmental temperatures, R is a resistivity ($\Omega$) of the conducted portion and d is a distance between the first crystal plane and the second crystal plane.

Accordingly, in order to limit the voltage V applied to the optical waveguide portion under thinkable temperature variation rate below 10 V/cm, 10>QR/d should be satisfied. That is to say, the resistivity R of the connected portion should be designed to satisfy R<10>d/Q. Moreover, if it is necessary to act the optical waveguide device always in a good condition under thinkable environmental temperature, the resistivities of both of the first conductive layer and the second conductive layer may be set below 100$\Omega$/cm$^2$.

Hereinafter, preferable embodiments of the first aspect of the invention will be explained with reference to FIGS. 1 to 14.

FIG. 1 is a plan view showing one embodiment of the optical waveguide device according to the first aspect of the invention. In FIG. 1, an optical waveguide substrate 3 is formed by an X-cut plate made of LiNbO$_3$, LiTaO$_3$, Li(Nb$_x$, Ta$_{1-x}$)O$_3$, and so on. A three dimensional optical waveguide 7 is formed on one major plane 3a of the optical waveguide substrate 3. The optical waveguide substrate 3 comprises a linear portion 7a in a light input side, a Y-branch portion 7b, and a pair of linear portions 7c, 7d in a light output side.

Electrodes 6A and 6C are formed in parallel in such a manner that the linear portion 7c is arranged between the electrodes 6A and 6C. Electrodes 6B and 6C are also formed in parallel in such a manner that the linear portion 7d is arranged between the electrodes 6B and 6C. Therefore, it is possible to apply a control voltage to the linear portions 7c, 7d and to modulate a phase of the light transmitted through respective linear portions 7c, 7d.

An optical fiber support substrate 2A is connected to the light input side of the optical waveguide substrate 3 to support an optical fiber 1A. The optical fiber 1A and the linear portion 7a are optically coupled. Moreover, an optical fiber support substrate 2B is connected to the light output side of the optical waveguide substrate 3 to support a pair of optical fibers 1B. Respective optical fibers 1B and respective linear portions 7c, 7d are optically coupled.

In the optical waveguide device shown in FIG. 1, the optical waveguide substrate 3 has a first crystal plane 20 (for example –Z plane) and a second crystal plane 30 (for example +Z plane). A first conductive layer 4 is formed on the first crystal plane 20. A second conductive layer 14 is formed on the second crystal plane 30. Negative charges are generated in the first crystal plane 20, and positive charges are generated in the second crystal plane 30. In this embodiment, the first conductive layer 4 and the second conductive layer 14 are electrically connected via a conductive layer (conduction pattern) 5 formed on the major plane 3a.

FIG. 2 is a plan view showing another embodiment of the optical waveguide device according to the first aspect of the invention. FIG. 3a is a side view viewed from a crystal plane 20B side of the optical waveguide device shown in FIG. 2, and FIG. 3b is a side view viewed from a crystal plane 20A side of the optical waveguide device shown in FIG. 2. In the embodiments shown in FIGS. 2, 3a and 3b, the portions similar to those of FIG. 1 are denoted by the same numerals, and the explanations thereof are omitted here.

In the optical waveguide device according to these embodiments, a dummy substrate 13 made of ferroelectric crystal is arranged under the other major plane 3b of the optical waveguide substrate 3. One major plane 13a is not opposed to the optical waveguide substrate 3, and the other major plane 13b is opposed to the major plane 3b of the optical waveguide substrate 3. Therefore, as shown in FIG. 3a, a second crystal plane 30A (–Z plane) of the dummy substrate 13 is arranged in the same side of the first crystal plane 20B (+Z plane). Moreover, as shown in FIG. 3b, a second crystal plane 30B (+Z plane) of the dummy substrate 13 is arranged in the same side of the first crystal plane 20A (–Z plane). Then, as shown in FIG. 3a, a first conductive layer 4B is formed on the first crystal plane 20B, and a second conductive layer 14A is formed on the second crystal plane 30A. Further, the first conductive layer 4B and the second conductive layer 14A are electrically connected by conduction members 8. In FIGS. 3a and 3b, the conductive layers are shown by a hatched area. Also as shown in FIG. 3b, a first conductive layer 4A is formed on the first crystal plane 20A, and a second conductive layer 14B is formed on the first crystal plane 20A. Further, the first conductive layer 4A and the second conductive layer 14B are electrically connected by the conduction members 8.

In order to eliminate the pyroelectrical effects, materials and dimensions of the dummy substrate 13 should be equal to those of the optical waveguide substrate 3. However, even in the case that the material of the dummy substrate 13 is not equal to those of the optical waveguide substrate 3, it is possible to neutralize the charges generated therein by suitably adjusting the dimensions of the dummy substrate 3.

FIG. 4 is a side view showing another embodiment of the first aspect of the invention, in which respective first crystal planes 20B of two optical waveguide substrates 3 are electrically connected to the second crystal plane 30a of one dummy substrate 13. In FIG. 4, the portions similar to those of FIG. 1 are denoted by the same numerals, and the explanations thereof are omitted here. In this embodiment, the dummy substrate 13 is arranged between two optical waveguide substrates 3. One major plane 13a of the dummy substrate 13 is opposed to the major plane 3a of the lower optical waveguide substrate 3, and the other major plane 13b of the dummy substrate 13 is opposed to the major plane 3b of the upper optical waveguide substrate 3.

Therefore, a second crystal plane 30A (–Z plane) of the dummy substrate 13 is arranged in the same sides of the first crystal planes 20B (+Z plane) of respective optical waveguide substrates 3. Moreover, a second crystal plane 30B (+Z plane) not shown of the dummy substrate 13 is arranged in the same side of the first crystal planes 20A (–Z plane) of respective waveguide substrates 3. As shown in FIG. 4, the first conductive layers 4B are formed respectively on the first crystal planes 20B, and the second conductive layer 14A is formed on the second crystal plane 30A. Further, respective conductive layers 4B and the conductive layer 14A are electrically conducted by the conduction members 8. Moreover, not shown in FIG. 4, the first conductive layers 4A are formed on respective first crystal planes 20A, and the second conductive layer 14B is formed on the second crystal plane 30B. Further, the first conductive layers 4A and the second conductive layer 14B are electrically conducted by the conduction members 8.

Figure 5A:
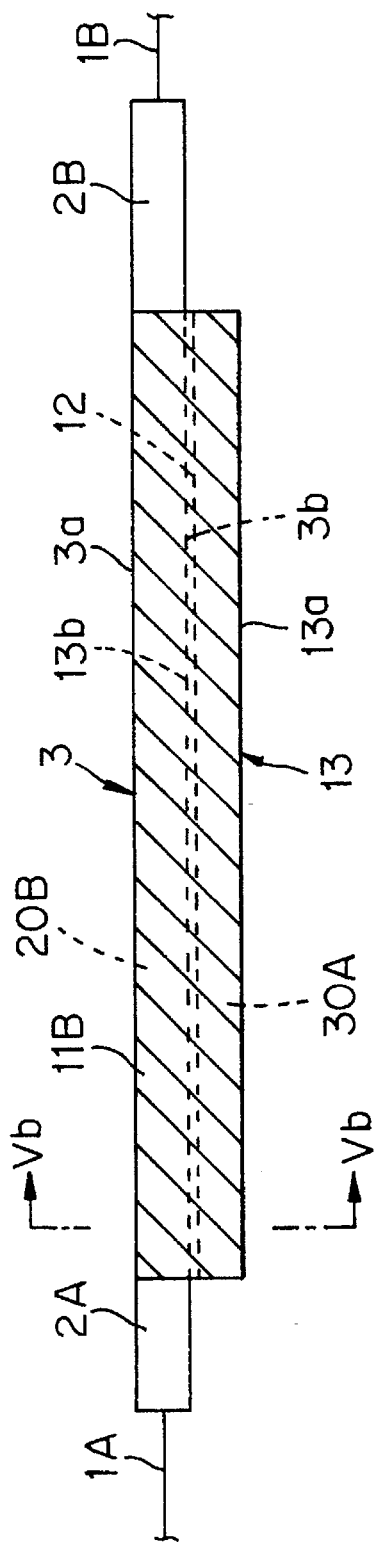
FIG. 5a is a side view illustrating another embodiment of the optical waveguide device according to the first aspect of the invention.
Figure 5B:
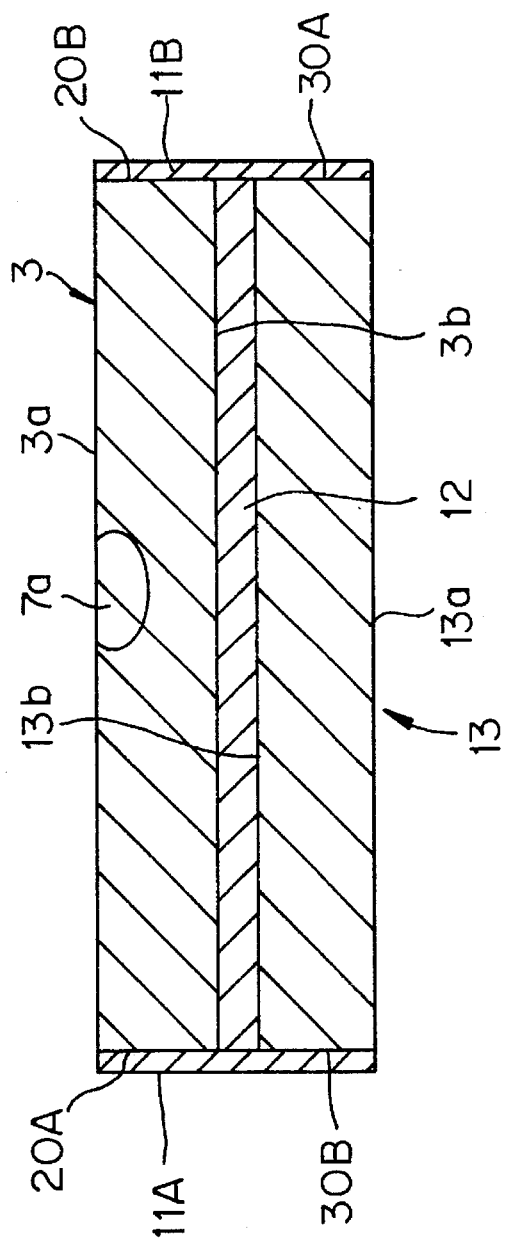

FIG. 5a is a side view showing another embodiment of the optical waveguide device according to the first aspect of the invention, and FIG. 5b is a cross sectional view cut along Vb—Vb line in FIG. 5a. In this embodiment, the dummy substrate 13 is arranged under the major plane 3b of the optical waveguide substrate 3. The major plane 13b of the dummy substrate 13 is opposed to the major plane 3b of the optical waveguide substrate 3. Therefore, as shown in FIG. 5a, the second crystal plane 30A (–Z plane) of the dummy substrate 13 is arranged in the same side of the first crystal plane 20B (–Z plane). Moreover the second crystal plane 30B (+Z plane) of the dummy substrate 13 is arranged in the same side of the first crystal plane 20A (–Z plane).

Further, in this embodiment, the optical waveguide substrate 3 and the dummy substrate 13 are stacked through an adhesive layer 12. The first crystal plane 20B and the second crystal 30A are arranged in the same side, and a conductive layer 11B is formed continuously on the first crystal plane 20B and the second crystal plane 30A. The first crystal plane 20a and the second crystal plane 30B are arranged in the same side, and a conductive layer 11A is formed continuously on the first crystal plane 20a and the second crystal plane 30B.

Figure 6A:
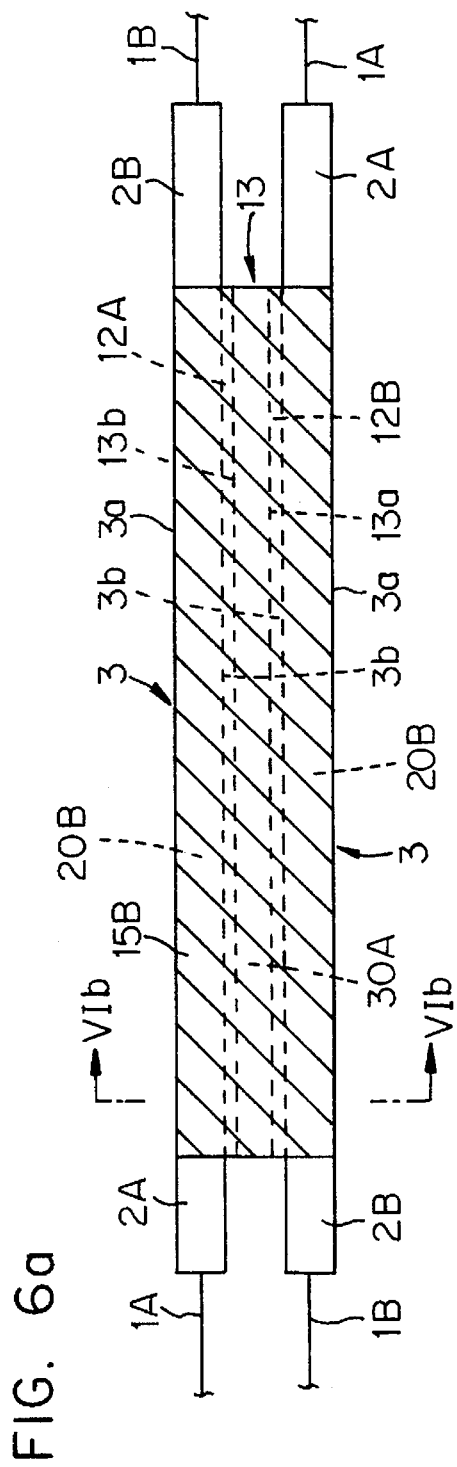
FIG. 6a is a side view depicting another embodiment of the optical waveguide device according to the first aspect of the invention.
Figure 6B:
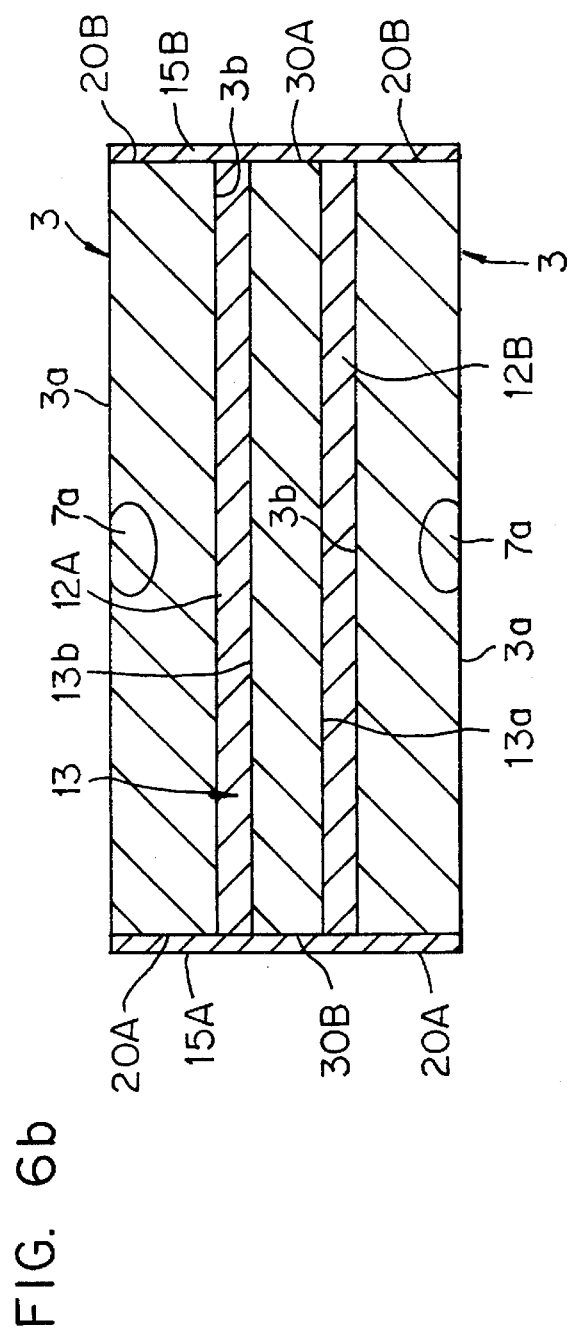

FIG. 6a is a side view showing another embodiment of the optical waveguide device according to the first aspect of the invention, and FIG. 6b is a cross sectional view cut along VIb—VIb line in FIG. 6a. In this embodiment, the dummy substrate 13 is arranged between two optical waveguide substrates 3 through adhesive layers 12A and 12B. The second crystal plane 30A (–Z plane) of the dummy substrate 13 is arranged in the same side of respective first crystal planes 20B (+Z plane) of respective optical waveguide substrates 3. Moreover, the second crystal plane 30B (+Z plane) of the dummy substrate 13 is arranged in the same side of the first crystal planes 20A (–Z plane).

Two first crystal planes 20B and the second crystal plane 30A are arranged in the same side, and a conductive layer 15B is arranged continuously on two first crystal planes 20B and one second crystal plane 30A. Moreover, two first crystal planes 20A and the second crystal plane 30B are arranged in the same side, and a conductive layer 15A is arranged continuously on two first crystal planes 20a and one second crystal plane 30B.

Figure 7A:
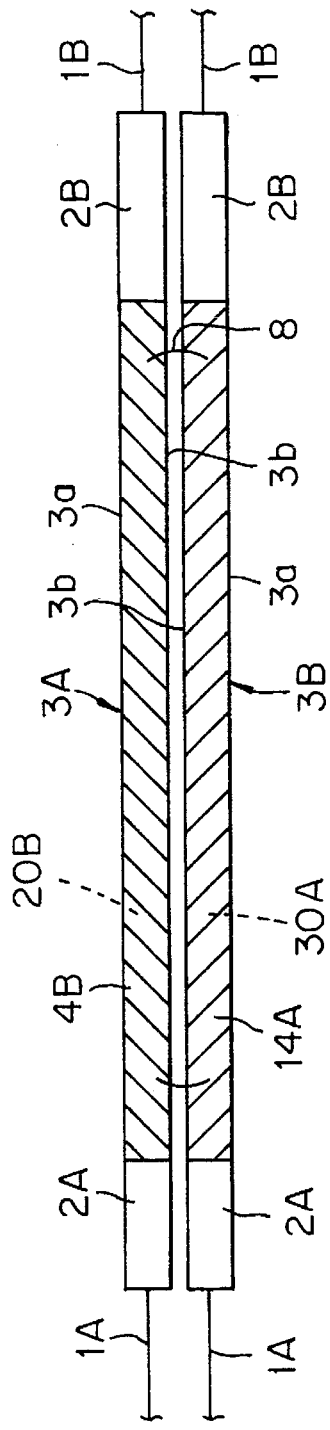
FIGS. 7a and 7b are side views respectively showing another embodiment of the optical waveguide device according to the first aspect of the invention.
Figure 7B:
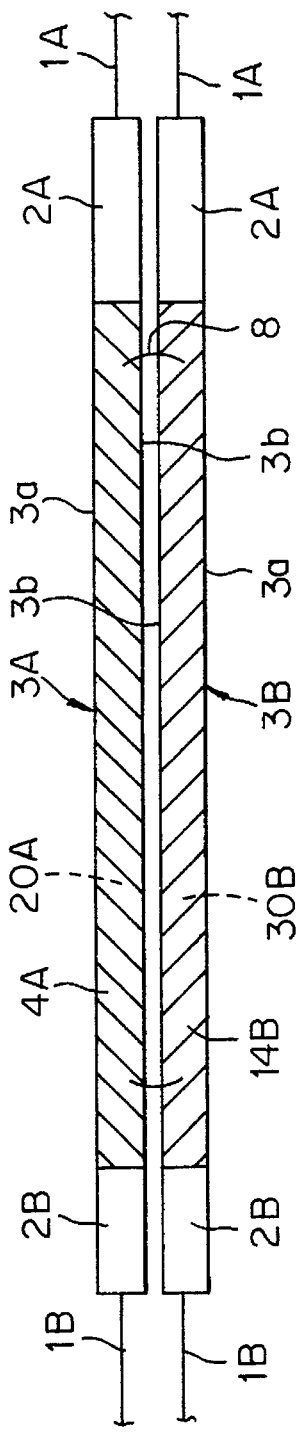

FIGS. 7a and 7b are side views respectively showing another embodiment of the optical waveguide device according to the first aspect of the invention. In FIGS. 7a and 7b, portions similar to those of FIG. 1 are denoted by the same numerals, and the explanations thereof are omitted here. In this embodiment, no dummy substrate is used. That is to say, as shown in FIGS. 7a and 7b, one optical waveguide substrate 3A and the other optical waveguide substrate 3B are stacked with each other. The major plane 3b of the optical waveguide substrate 3A is opposed to the major plane 3b of the optical waveguide substrate 3B. Therefore, as shown in FIG. 7a, the first crystal plane 20B (+Z plane) of the optical waveguide substrate 3A and the second crystal plane 30A (–Z plane) of the optical waveguide substrate 3B are arranged in the same side. In the reverse side not shown in FIG. 7a, the first crystal plane 20a (–Z plane) of one optical waveguide substrate 3A and the second crystal plane 30B (+Z plane) of the optical waveguide substrate 3B are arranged in the same side.

Then, as shown in FIG. 7a, the first conductive layer 4B is formed on the first crystal plane 20B, and the second conductive layer 14A is formed on the second crystal plane 30A. Further, the first conductive layer 4B and the second conductive layer 14A are electrically connected by the conduction members 8. Moreover, as shown in FIG. 7b, the first conductive layer 4A is formed on the first crystal plane 20A, and the second conductive layer 14B is formed on the second crystal plane 30B. Further, the first conductive layer 4A and the second conductive layer 14B are electrically connected by the conduction members 8.

Figure 8A:
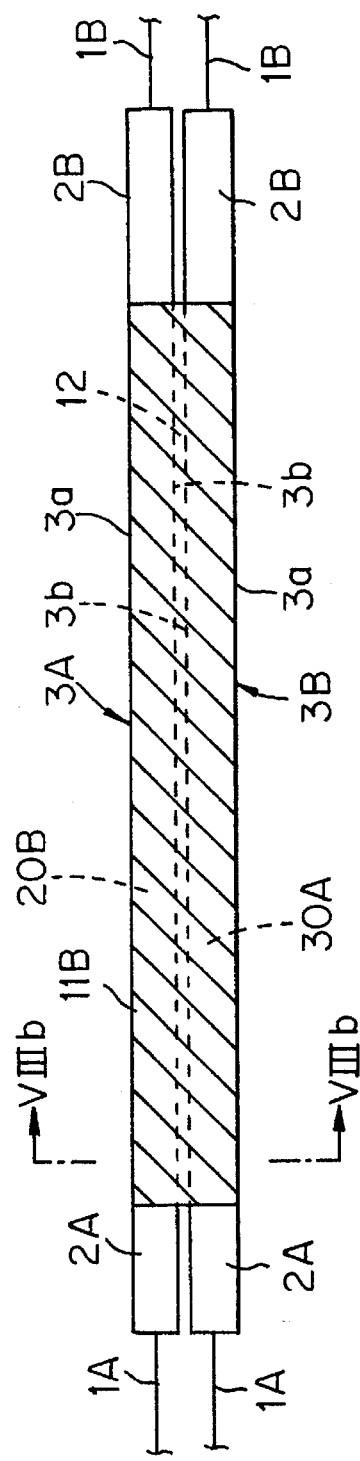
FIG. 8a is a side view illustrating another embodiment of the optical waveguide device according to the first aspect of the invention.
Figure 8B:
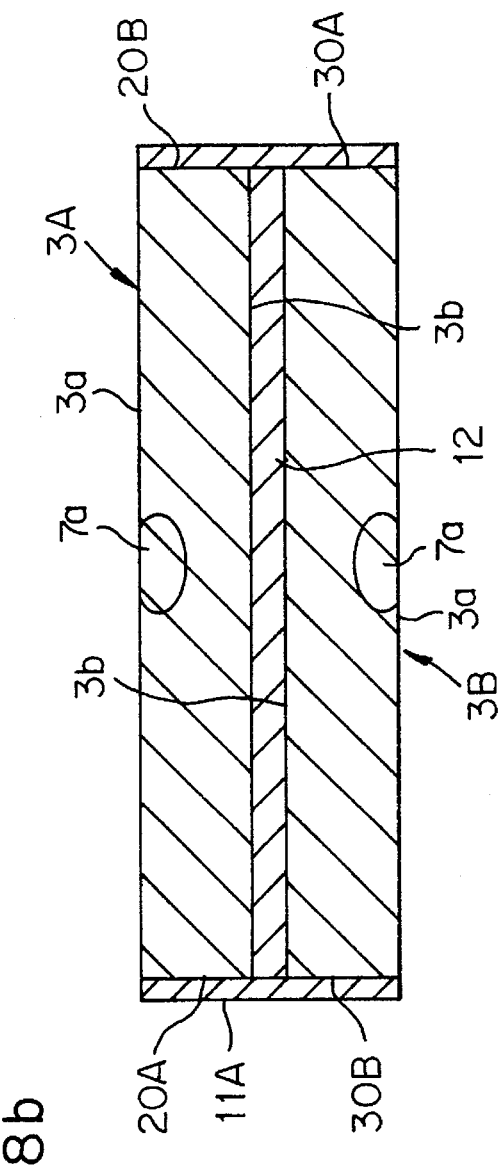

FIG. 8a is a side view showing another embodiment of the optical waveguide device according to the first aspect of the invention, and FIG. 8b is a cross sectional view cut along VIIIb—VIIIb line in FIG. 7a. In FIG. 8a, one optical waveguide substrate 3A and the other optical waveguide substrate are arranged up and down. The major plane 3b of the optical waveguide substrate 3A is opposed to the major plane 3b of the optical waveguide substrate 3B. Therefore, the first crystal plane 20B (+Z plane) of the optical waveguide substrate 3A and the second crystal plane 30A (–Z plane) are arranged in the same side. In the reverse side not shown in FIG. 8a, the first crystal plane 20A (–Z plane) of the optical waveguide substrate 3A and the second crystal plane 30B (+Z plane) of the optical waveguide substrate 3B are arranged in the same side.

Two optical waveguide substrates 3A and 3B are stacked through the adhesive layer 12 so as to integrate the optical waveguide substrates 3A and 3B. The first crystal plane 20B and the second crystal plane 30A are aligned in the same side, and the conductive layer 11B is formed continuously on the first crystal plane 20B and the second crystal plane 30A. Moreover, the first crystal plane 20A and the second crystal plane 30B are aligned in the same side, and the conductive layer 11A is formed continuously on the first crystal plane 20A and the second crystal plane 30B.

Figure 9:
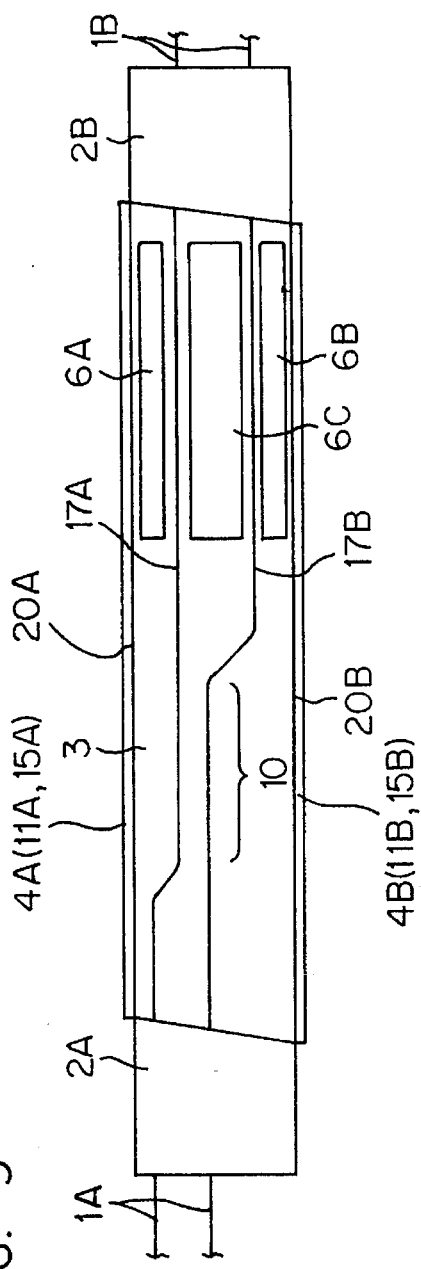
FIG. 9 is a plan view depicting another embodiment of the optical waveguide device according to the first aspect of the invention.
Figure 10:
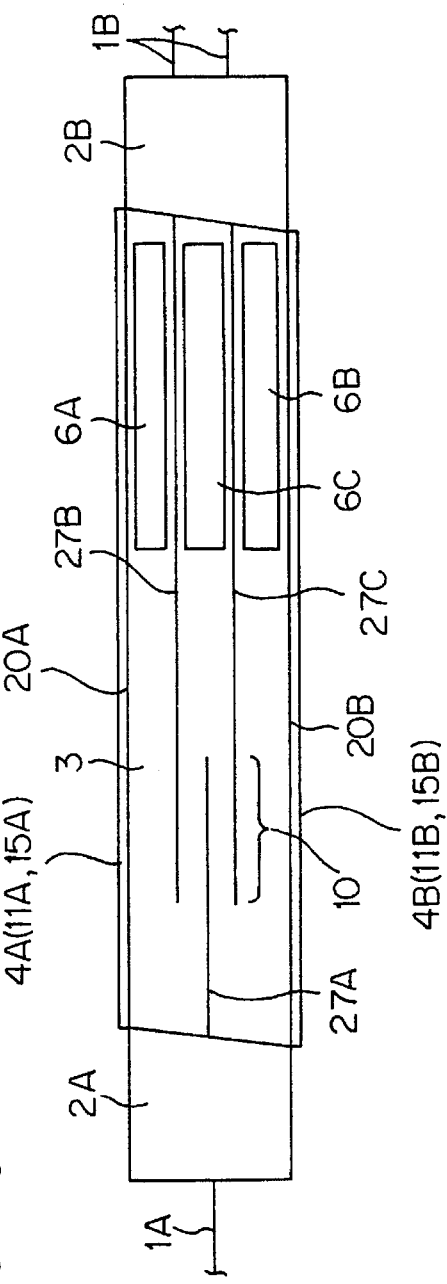
FIG. 10 is a plan view showing another embodiment of the optical waveguide device according to the first aspect of the invention.
Figure 11:
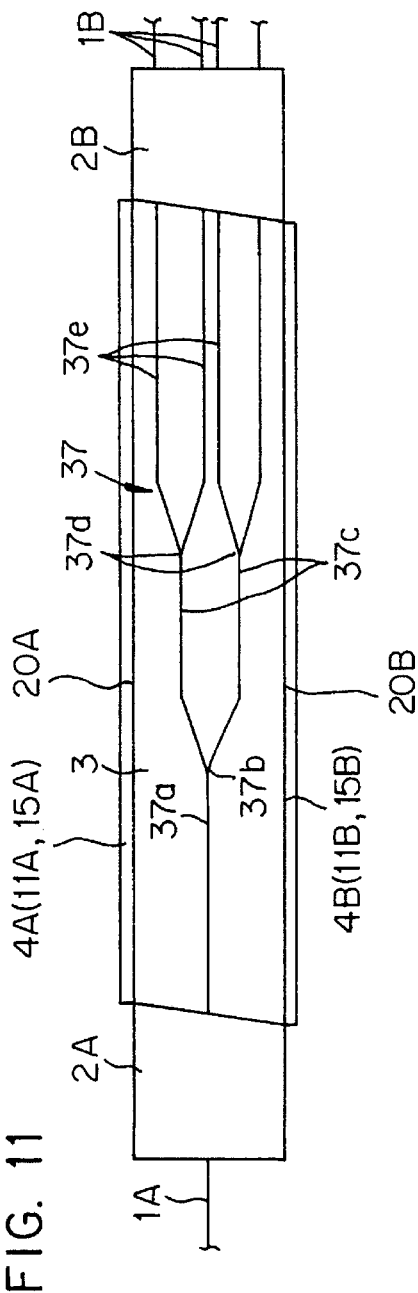
FIG. 11 is a plan view illustrating another embodiment of the optical waveguide device according to the first aspect of the invention.

FIGS. 9, 10 and 11 are plane views respectively showing another embodiment of the optical waveguide device according to the first aspect of the invention. In FIGS. 9 and 10, use is made of a directional coupler at a light branch portion of the optical waveguide.

In the embodiment shown in FIG. 9, a pair of optical waveguides 17A and 17B are formed in one major plane of the optical waveguide substrate. The optical waveguides 17A and 17B are arranged closely in a region of a couple portion 10, and a light guided through one of the optical waveguides is divided in the couple portion 10. By varying a length of the couple portion 10, it is possible to vary the light dividing ratio in a range of 0:100–50:50. In this embodiment, light transmitted through respective optical waveguide can be modulated by electrodes 6A, 6B and 6C. Moreover, it is possible to form the conductive layers on the side planes of the optical waveguide 3 as shown in FIGS. 1 to 8.

In the embodiment shown in FIG. 10, a directional coupler having three parallel waveguides is formed in the optical waveguide substrate 3. An optical waveguide 27A in a light input side is arranged near optical waveguides 27B and 27C in a light output side, in a region of a couple portion 10, and a light guided through the optical waveguide 27A is divided in the couple portion 10. In the embodiments shown in FIGS. 9 and 10, if a voltage is applied to the couple portion 10, a light dividing ratio can be varied in response to the guided light to be divided. Moreover, it is possible to form the conductive layers on the side planes of the optical waveguide substrate 3 as shown in FIGS. 1 to 8.

In the embodiment shown in FIG. 11, the first aspect of the invention is applied to the star coupler mentioned above. In an optical waveguide 37, a linear portion 37a in a light input side is divided into linear portions 37c at a Y-branch portion 37b. Further, linear portions 37a are divided respectively into linear portions 37e at Y-branch portion 37d. The linear portions 37e are respectively coupled to optical fibers 1B. In this embodiment, if a voltage is applied to the linear portions 37e, it is possible to perform a multiple modulation. Moreover, it is possible to form the conductive layer on the side planes of the optical waveguide substrate 3 as shown in FIGS. 1 to 8.

EXAMPLE 1

Figure 12:
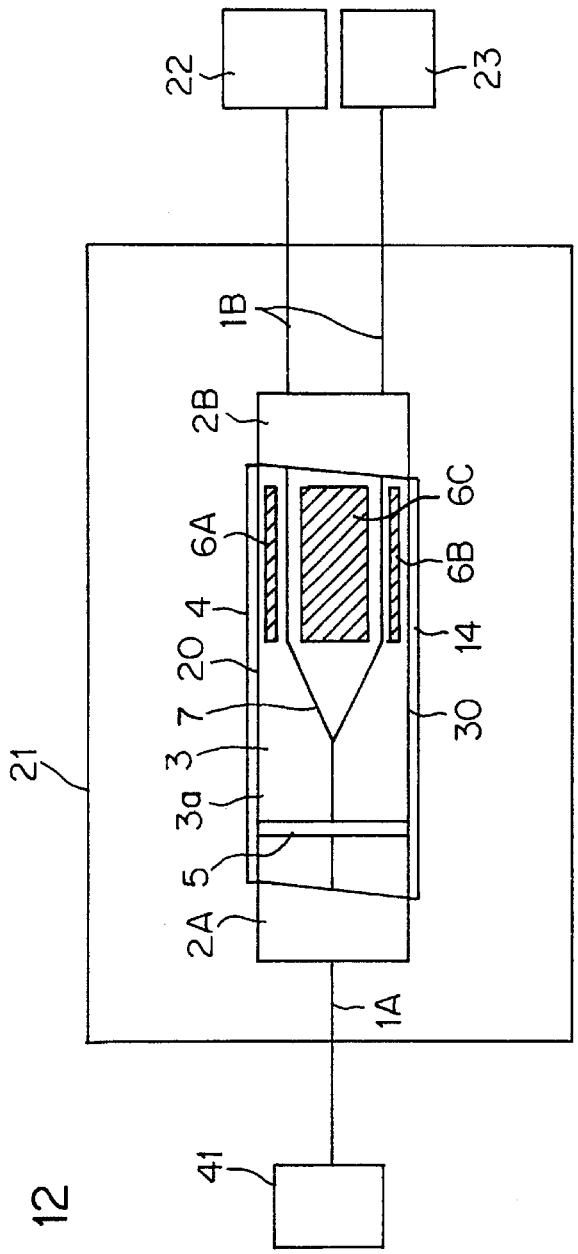
FIG. 12 is a plan view depicting an apparatus for measuring a light insertion loss and a light dividing ratio with respect to the optical waveguide device.

Experiments were performed by using a measuring apparatus shown in FIG. 12. That is to say, the optical waveguide devices according to the examples of the first aspect of the invention and the comparative examples were accommodated in a temperature adjusting device. As for the optical waveguide devices according to the examples of the first aspect of the invention, use was made of the optical waveguide device having the construction shown in FIG. 1, and properties as the phase modulator for use in fiber optics gyroscope were measured.

The optical waveguide devices were manufactured in the following manner. At first, a disk-shaped wafer made of LiNbO$_3$ having x-cut plane was prepared. The wafer had a diameter of 3 inches and a thickness of 1 mm. A titanium thin layer having a width of 3 μm and is a thickness of 500 angstrom was formed on the wafer by using the photolithography technique, and a titanium component was diffused into the LiNbO$_3$ by effecting a heat treatment such as 1000° C.×6 hours to form the titanium diffused optical waveguide 7.

After that, electrodes 6A, 6B and 6C made of metal layers were respectively formed. Dimensions of respective electrodes were a length of 15 mm and a thickness of 2500 angstrom, and a gap distance between adjacent electrodes was 10 μm. From this wafer, the optical waveguide substrates 3 for one chip were cut out.

Then, according to the first aspect of the invention, the conductive layers 4 and 14 were formed. As for the material of respective conductive layers, use was made of a conductive paste (silver paste), and the conductive paste layer was formed by spraying method. A resistivity rate of respective conductive layers was not more than 10 Ω/cm². As for the material of the conduction layer 5, use was made of a conductive paste (silver paste), and the conductive paste layer was formed by the spraying method. A resistivity of the conduction layer 5 was not more than 1 Ω. To the both ends of the optical waveguide substrate 3, the optical fibers 1A and 1B were connected as shown in FIG. 1 to obtain specimens according to the invention. At the same time, the optical waveguide devices according to the comparative example were manufactured in the same manner as mentioned above. However, the specimens according to the comparative examples have no conductive layers 4, 14 and no conductive layer 5.

Then, a light having a wavelength of 0.85 μm was introduced from a light source 41, and output lights transmitted through a pair of optical fibers 1B were measured by light amount measuring apparatuses 22, 23. After that, a light insertion loss and a light dividing ratio were calculated from respective measured values of respective light amount measuring apparatuses.

Figure 13:
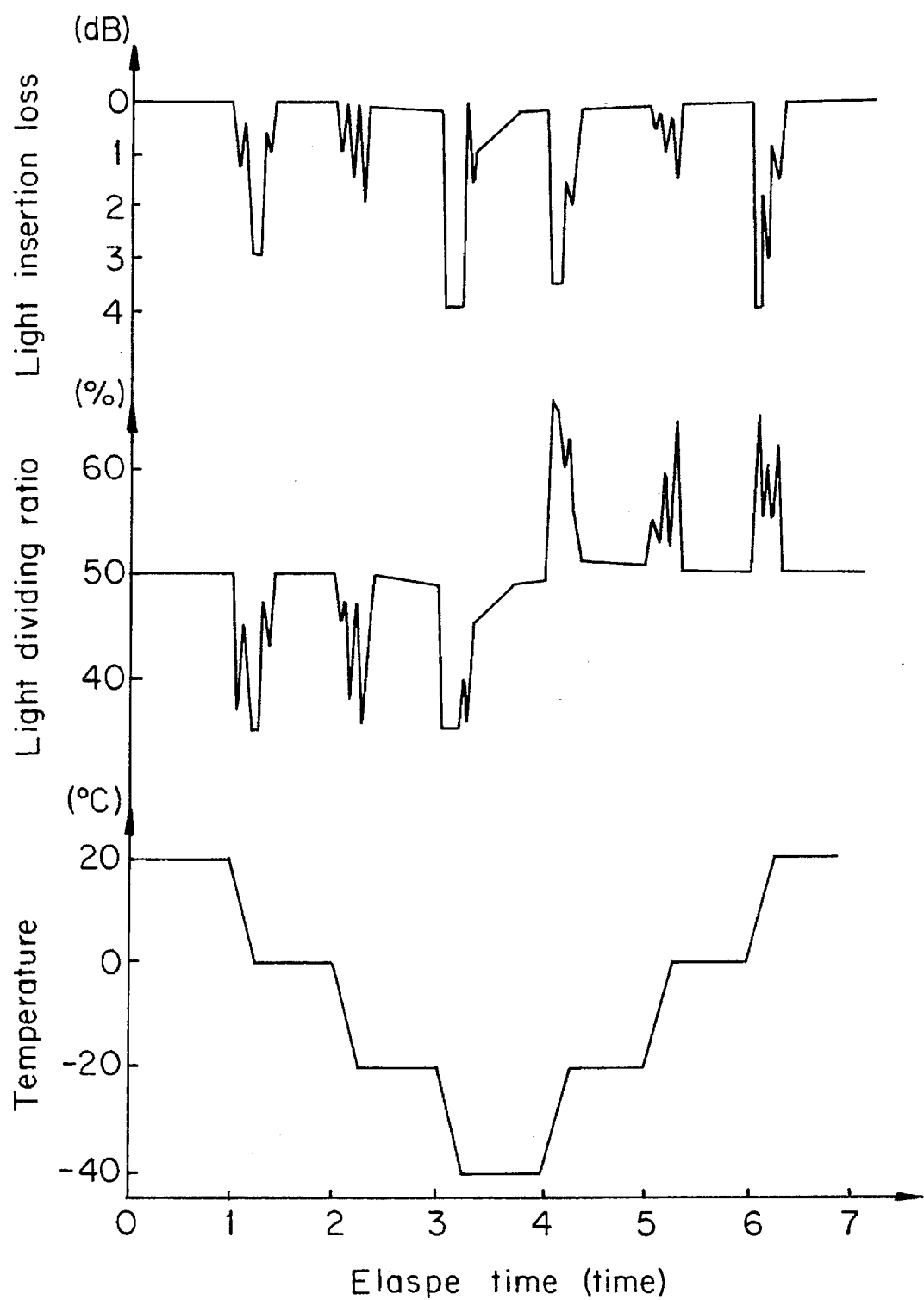
FIG. 13 is a graph showing a relation between the environmental temperature and the light insertion loss or the light dividing ratio in the comparative example.
Figure 14:
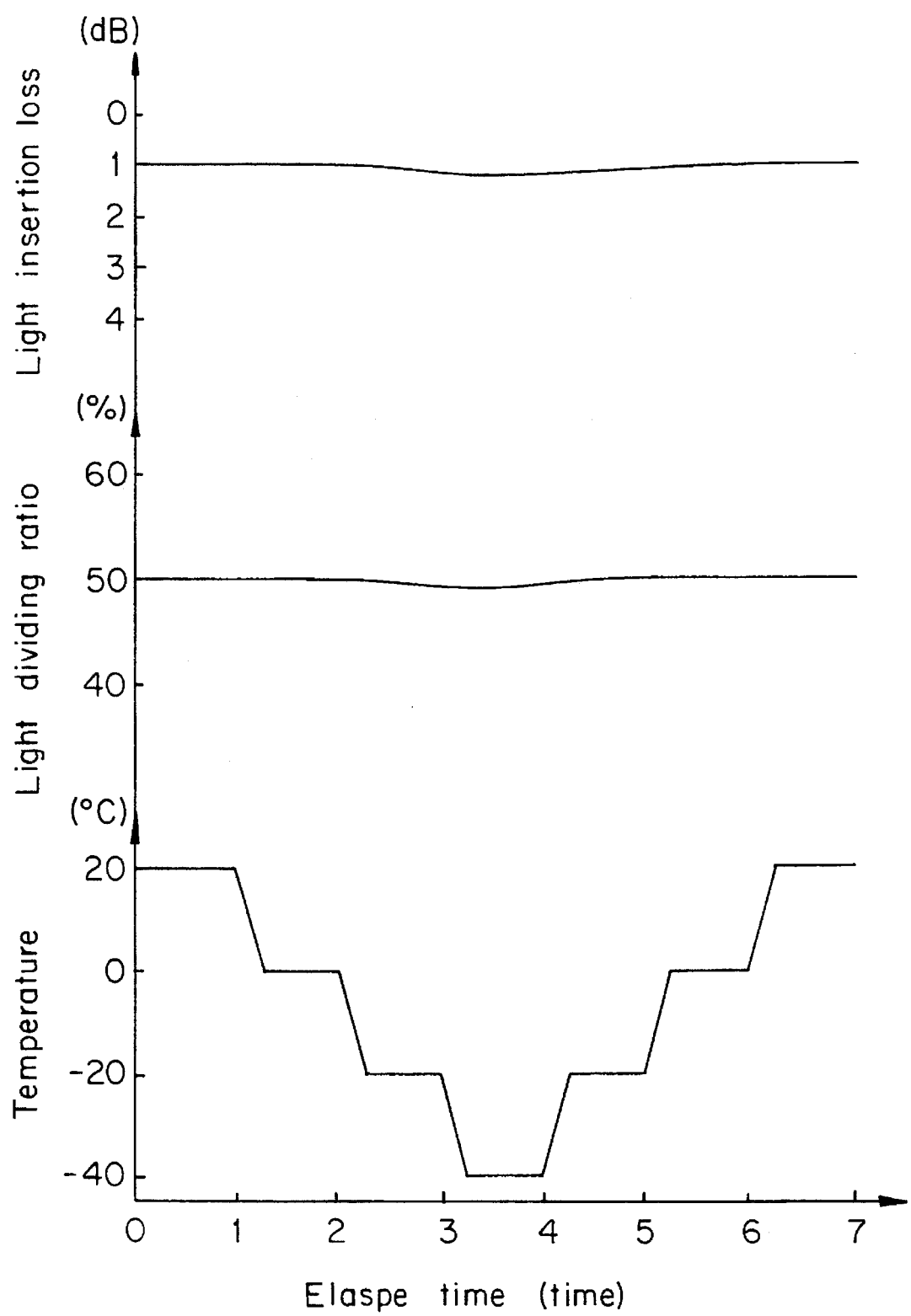
FIG. 14 is a graph illustrating a relation between the environmental temperature and the light insertion loss or the light dividing ratio in the embodiment according to the first aspect of the invention.

During this measuring operation, as shown in FIGS. 13 and 14, the environmental temperature of the optical waveguide devices were varied. That is to say, the environmental temperature was varied stepwise from 20° C. to –40° C. In this case, a holding time at respective temperatures was about 45 minutes, and an ascending rate and a descending rate of temperature was 80° C./hour.

As a result, FIG. 13 shows the results of the comparative example, and FIG. 14 shows the results of the example according to the first aspect of the invention. As shown in FIG. 13, in the comparative example, when the environmental temperature ascended or descended, both of the light insertion loss and the light dividing ratio were varied largely. It should be noted that, in FIG. 13, a region of the light insertion loss more 4 dB and a region of the light dividing ratio more than 30:70 were cut out. Contrary to this, in the example according to the first aspect of the invention, both of the light insertion loss and the light dividing ratio were not varied as shown in FIG. 14. In this case, a variation of the light insertion loss was less than 0.4 dB, and a variation of the light dividing ratio was in a range of 50:50–52:48.

Moreover, the optical waveguide devices according to the present invention and according to the comparative example were assembled in the fiber optics gyroscopes as modulators. Then, as shown in FIGS. 13 and 14, the environmental temperature was varied. As a result, in the comparative example, the calculated rotation angular rate was varied by more than 20%, and sometimes it was not possible to measure the rotation angular rate. In the example according to the first aspect of the invention, the calculated rotation angular rate was varied by 4%.

Further, the optical waveguide devices shown in FIGS. 2, 3 and 7 were manufactured in the same manner mentioned above. Then, the same experiment was performed with respect to respective optical waveguide devices. As a result, the same results as those shown in FIG. 14 were obtained.

As mentioned above, according to the first aspect of the invention, it is possible to obtain the optical waveguide device showing no variations of the light dividing ratio and no variation of the light insertion loss even if the environmental temperature is varied.

Hereinafter, the second aspect of the invention will be explained. In the second aspect of the invention, the electrical connection between the first conductive layer and the second conductive layer is preferably performed in one of the following methods.

(1) When control electrodes are formed on a surface (optical waveguide forming side) of the optical waveguide substrate, conduction patterns for the electrical conduction are formed thereon at the same time. According to this method, the conduction patterns can be formed at the same time when the control electrodes are formed by the screen printing method or the vapor deposition method, and thus the electrical connection can be performed simply. However, in this method, the conduction patterns become sometimes a cause of the light insertion loss of the optical waveguide.

(2) On the surface (optical waveguide forming side) of the optical waveguide substrate, the first conductive layer and the second conductive layer are connected by means of wires. In this case, the wires are passed above the optical waveguide. Therefore, since the wires are not electrically conducted to the optical waveguide, there is no possibility to generate the light insertion loss in the optical waveguide. However, it is necessary to electrically connect the wires to respective conductive layers.

(3) The first conductive layer and the second conductive layer are respectively formed as a part of the same integrated conductive layer. Also in this case, the integrated conductive layer can be formed at the same time when the control electrodes are formed by the screen printing method or the vapor deposition method.

Especially, in the active optical waveguide device having a construction such that, the control electrodes are arranged at outer portions and inner portions of respective divided optical waveguides, and control voltages can be applied to respective divided optical waveguides by the control electrodes, the first conductive layer and the second conductive layer can be electrically conducted to the control electrodes of the outer portions respectively.

Moreover, in the active optical waveguide device mentioned above, the first conductive layer and the second conductive layer can be electrically isolated from the control electrodes of the outer portions respectively. In this case, since potentials at the first conductive layer and the second conductive layer are not affected by a potential applied to the control electrode, the pyroelectrical effects can be preferably eliminated.

Further, in the functional portions mentioned above, third conductive layers are formed on regions between a plurality of divided optical waveguides, and the third conductive layers are electrically connected to at least one of the first conductive layer and the second conductive layer. In this case, even in an inner region of the functional portions, the pyroelectrical effects can be preferably eliminated.

Moreover, in the active optical waveguide device having a construction such that, the control electrodes are arranged at outer portions and inner portions of respective divided optical waveguides, and control voltages can be applied to respective divided optical waveguides by the control electrodes, it is preferred to isolate the third conductive layers from the control electrodes of the inner portions of respective divided optical waveguides. If the third conductive layers are electrically connected to the control electrodes of the inner portion, potentials of respective conductive layers are affected by potential variations of the control electrodes of the inner portions specially, in the case that the first conductive layer and the second conductive layer are electrically connected to the control electrodes of the outer portions, it is necessary to electrically isolate the third conductive layer from the control electrodes of the inner portions.

In the second aspect of the invention, the materials of the ferroelectric crystals and the forming method of the optical waveguides are the same as those of the first aspect of the invention mentioned above.

In the optical waveguide devices according to the second aspect of the invention, at least one functional portions for dividing or coupling lights is arranged in the optical waveguide. A shape of the optical waveguide may be planar or may be curved. The functional portions may be so-called Y-branch portion or directional couplers.

The Y-branch portion is formed by coupling one row of the optical waveguide and two rows of the optical waveguides, and functions to divide and/or couple lights. The directional coupler is formed by arranging adjacent optical waveguides very closely and functions to shift a guided light from on optical waveguide to the other optical waveguide. Therefore, a guided light can be divided by the directional coupler at any light dividing ratios. Moreover, the directional coupler can be used together with the Y-branch.

The optical waveguide devices according to the second aspect of the invention can be used for active devices and passive devices. As for the passive devices, use is made of beam splitters, star couplers having a waveguide of cascade type consisting of a plurality of Y-branch portions, and so on. As for the active devices, use is made of light intensity modulators, phase modulators, optical switching devices, acoustic-optics devices, logic devices for optical computer (AND element, OR element), multiple modulators having such a construction that optical modulation electrodes are arranged to the star coupler, and so on.

Especially in the optical modulators of the fiber optic gyroscope among the active devices, if the light dividing ratio of the divided lights ins out of the predetermined value, the rotation rate of the optical system to be measured is extraordinarily varied, and thus it is not possible to perform the precise measurement. Therefore, the optical waveguide devices according to the second aspect of the invention can be preferably used for the above-mentioned aims.

Moreover, in the Mach-Zehnder light intensity modulator, there is a problem such that the extinction ration is varied. The second aspect of the present invention can preferably eliminate such a problem. Further, in the optical waveguide devices for dividing lights such as the beam splitters, the optical switching devices, the logic devices, and so on, they output erroneous values if the divided light is varied. Therefore, the second aspect of the invention can be preferably applied for such devices. Especially, in the optical switching devices and the logic devices, ON-OFF states are detected from the divided light transmitted through two rows of optical waveguides. Therefore, if the divided light is varied over the threshold level, the ON state and the OFF state are exchanged, and thus it is not possible to use them.

Further, in the star coupler and the multiple modulators, a plurality of Y-branch portions are arranged to make the cascade construction. Therefore, if the light dividing ratio of respective Y-branch portions is varied out of the predetermined value, these variations are multiplied from input to output. Therefore, even if the variation of the light dividing ratio at one Y-branch portion is for example 5%, the multiplied variations become extraordinarily large value. The second aspect of the invention can be preferably applied to the star couplers and the multiple modulators.

As for the formation of the first, second and third conductive layers according to the second aspect of the invention, use is made of the same methods (1)~(4) as those shown in the first aspect of the invention.

Figure 15:
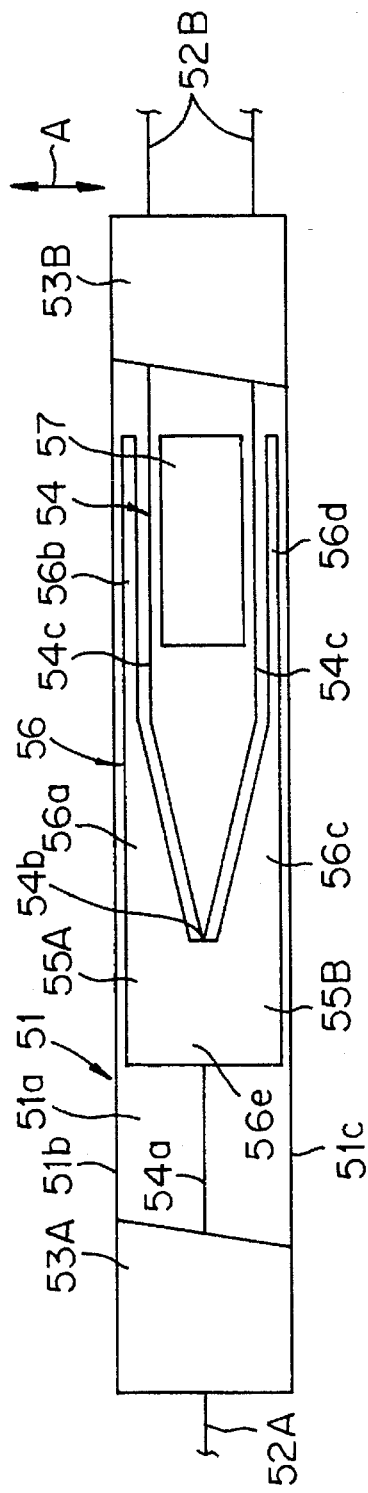
FIG. 15 is a plan view depicting one embodiment of an optical waveguide device according to the second aspect of the invention.

Hereinafter, the second aspect of the invention will be explained, with reference to the drawings. FIG. 15 is a plane view showing one embodiment of the second aspect of the invention. In this embodiment, an optical waveguide device 51 is formed by an X-cut plate made of $LiNbO_3$, $LiTaO_3$ or $Li(Nb_x, Ta_{1-x})$. A three dimensional optical waveguide 54 is formed in a major plane 51a of the optical waveguide device 51. The optical waveguide 54 comprises a linear portion 54a in a light input side, a Y-branch portion 54b and a pair of linear portions 54c.

An optical fiber support substrate 53A is connected to alight input side of the optical waveguide substrate 51 to support an optical fiber 52A. The optical fiber 52A is optically coupled with the linear portion 54a. An optical fiber support substrate 53B is connected to a light output side of the optical waveguide substrate 51 to support a pair of optical fibers 52B. The optical fibers 52B are optically coupled with the linear portions 54c respectively.

In this embodiment, a spontaneous electric polarization direction of the optical waveguide substrate 1 made of ferroelectric crystals is a direction shown by an arrow A and is substantially perpendicular to a light proceeding direction. It is sufficient to cross this spontaneous electric polarization direction to the light proceeding direction by a predetermined angle, but it is preferred to set the cross angle at 90°. The optical waveguide substrate 51 has a first crystal plane 51b and a second crystal plane 51c. Positive charges and negative charges are generated respectively in the first crystal plane 51b and the second crystal plane 51c due to the pyroelectrical effects.

A first conductive layer 56a is formed in one region 55A extending from a boundary between the first crystal plane 51b and the major plane 51a to the Y-branch portion 54b, and a second conductive layer 56c is formed in the other region 55B extending from a boundary between the second crystal plane 51b and the major plane 51a to the Y-branch portion 54b. In this embodiment, the first conductive layer 56a and the second conductive layer 56c are integrated to construct an integrated conductive layer 56.

Next, a phase of the integrated conductive layer 56 will be explained. Respective conductive layers 56a, 56c have a rectangular shape. Outer sides of respective conductive layers 56a, 56c are linear along a boundary between the major plane 51a and respective crystal planes. Inner sides of respective conductive layers 56a, 56c are substantially along a shape of the optical waveguide. Respective conductive layers 56a, 56c are integrated by a connection portion 56e, and the connection portion 56e is arranged on the optical waveguide 54.

In FIG. 15, respective conductive layers 56a, 56c are arranged symmetrically with respect to a horizontal line. Thin control electrodes 56b, 56d are extended in parallel from respective conductive layers 56a, 56c. Respective linear portions 54c is arranged between inner control electrode 57 and respective control electrodes 56b or 56d.

Figure 16:
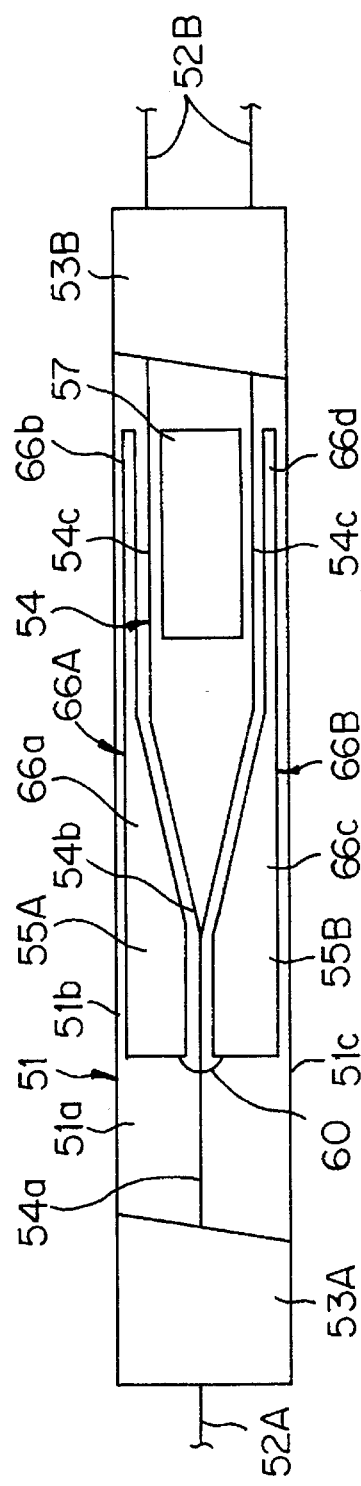
FIG. 16 is a plan view showing another embodiment of the optical waveguide device according to the second aspect of the invention.
Figure 17:
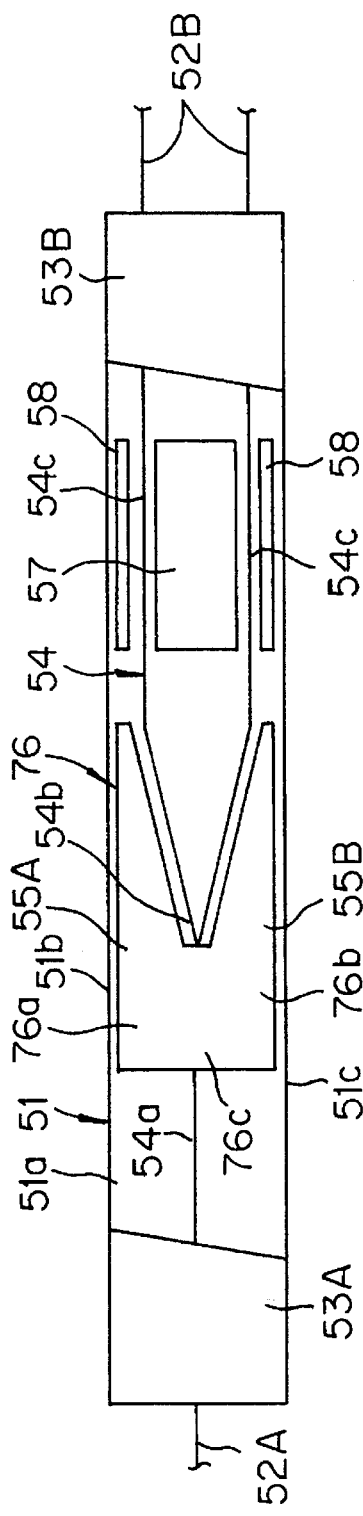
FIG. 17 is a plan view illustrating another embodiment of the optical waveguide device according to the second aspect of the invention.

FIGS. 16 and 17 are plane views respectively showing another embodiment according to the second aspect of the invention. In FIGS. 16 and 17, portions similar to those of FIG. 15 are denoted by the same numerals, and the explanations thereof are omitted here. In the optical waveguide device shown in FIG. 16, a pair of conductive layers 66A and 66B are arranged outside of the optical waveguide 54 and are arranged symmetrically with respect to a horizontal line.

The conductive layer 66A comprises a first conductive layer 66a and a control electrode 66b. The conductive layer 66b comprises a second conductive layer 66c and a control electrode 66d. Respective conductive layers 66a, 66c have a rectangular shape. Outer sides of respective conductive layers 66a, 66c are linear along a boundary between the major plane 51a and respective crystal planes. Inner sides of respective conductive layers 66a, 66c have substantially along a shape of the optical waveguide. Thin control electrodes 66b, 66d are extended in parallel from respective conductive layers 66a, 66c. Respective linear portions 54c are arranged between the inner control electrode 57 and respective control electrodes 56b or 56d.

Moreover, the first conductive layer 66a and the second conductive layer 66c are electrically connected by a connection member 60. As for the connection member 60, use is made of a conductive stripe, a conductive wire and so on.

In FIG. 17, a conductive layer 76 is isolated from a pair of control electrodes 58. Therefore, the conductive layer 76 has no voltage application function. Respective linear portions 54c are arranged respectively between the control electrode 57 and one of the control electrodes 58. The conductive layer 76 comprises a first conductive layer 76a, a second conductive layer 26b and a connection portion 76c. Respective conductive layers 76a, 76b has a rectangular shape. Outer sides of respective conductive layers 76a, 76b are linear along a boundary between the major plane 51a and respective crystal planes. Inner sides of respective conductive layers 76a, 76b are substantially along a shape of the optical waveguide. The connection portion 76c is arranged on the optical waveguide 54.

In the embodiments shown in FIGS. 15 to 17, the first conductive layer and the second conductive layer have a rectangular shape, and the inner sides of the conductive layers are along a shape of the optical waveguide. Therefore, a space between respective conductive layers and the optical waveguide and a space between the major plane 51a and an edge portion can be small, and thus the pyroelectrical effects for the Y-branch portions can be minimized.

Figure 18:
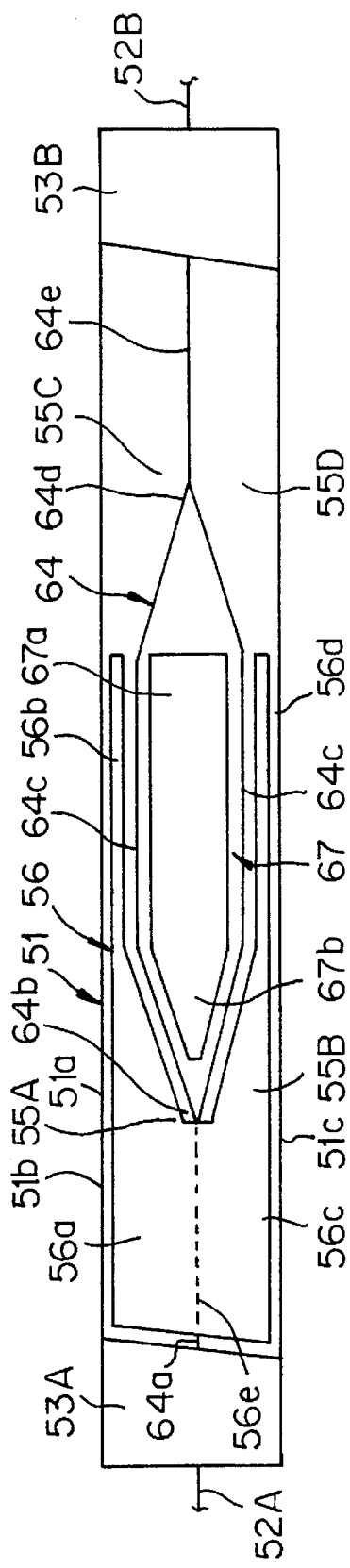
FIG. 18 is a plan view depicting another embodiment of the optical waveguide device according to the second aspect of the invention.
Figure 19:
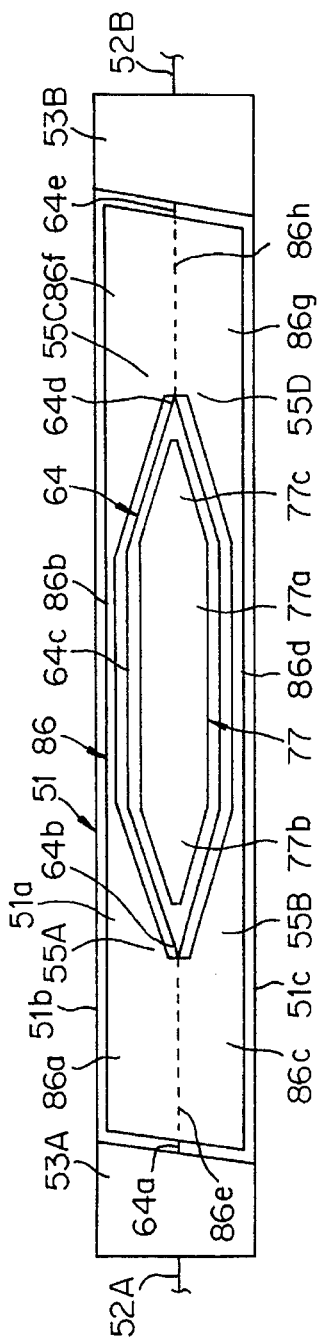
FIG. 19 is a plan view showing another embodiment of the optical waveguide device according to the second aspect of the invention.

FIGS. 18 and 19 are plane views respectively showing one embodiment of Mach-Zehnder light intensity modulator according to the second aspect of the invention. In the embodiments shown in FIGS. 18 and 19, an optical waveguide 64 comprises a linear portion 64a in a light input side, a Y-branch portion 64b, a pair of linear portion 64c, a Y-branch portion 64d and a linear portion 64e in a light output side. The optical fiber 52A is coupled to the linear portion 64a, and the optical fiber 52B is coupled to the linear portion 64e.

In the embodiment shown in FIG. 18, the conductive layer 56 is formed only in the side of the Y-branch portion 64b. Respective conductive layers 56a, 56c have a rectangular shape. Outer sides of the conductive layers 56a, 56c are linear along a boundary between the major plane 51a and respective crystal planes. Inner sides of the conductive layers 56a, 56c are substantially along a shape of the optical waveguide. Respective conductive layers 56a, 56c are integrated at the connection portion 56e, and the connection portion 56e is arranged on the optical waveguide 14.

In FIG. 18, respective conductive layers 56a, 56c are arranged symmetrically with respect to a horizontal line. Thin control electrodes 56b, 56d are extended in parallel from respective conductive layers 56a, 56c. A control electrode 67 arranged between a pair of the linear portions 64c comprises a rectangular portion 67a and a triangular portion 67b. Respective linear portions 64c are arranged between the rectangular portion 67a and the control electrodes 56b or 56d. The triangular portion 67b is extended toward the Y-branch portion 64b.

In the embodiment shown in FIG. 18, almost all region 55A extended from a boundary between the first crystal plane 51b and the major plane 51a to the Y-branch portion 64b is covered with the first conductive layer 56a. Moreover, almost all region 55B extended from a boundary between the second crystal plane 51c and the major plane 51a to the Y-branch portion 64b is covered with the second conductive layer 56c.

In the embodiment shown in FIG. 19, almost the entire region extending from a hexagonal region formed by the Y-branch portions 64b, 64d and a pair of linear portions 64c to edge portions of the major plane 51a, is covered with a conductive layer 86. Moreover, almost all inner portion of the hexagonal region is covered with a control electrode 77. The conductive layer 86 functions to act as an opposed electrode of the control electrode 77.

Further, a shape of the conductive layer 86 will be explained. In this embodiment, almost the entire region 55A is covered with a first conductive layer 86a and almost the entire region 55B is covered with a second conductive layer 86c. In a side of the Y-branch portion 64d, almost the entire region 55C extendeding from a boundary between the first conductive layer 51b and the major plane 51a to the Y-branch portion 64d is covered with a first conductive layer 86f. Moreover, almost the entire region 55D extending from a boundary between the second crystal plane 51c and the major plane 51a to the Y-branch portion 64d is covered with a second conductive layer 86g.

Respective conductive layers 86a, 86c, 86f and 86g have a rectangular shape. Outer sides of respective conductive layers 86a, 86c, 86f and 86g are linear along a boundary between the major plane 51a and respective crystal planes. Inner sides of these conductive layer are linear along a shape of the optical waveguide. The conductive layers 86a and 86c are integrated at a connection portion 86e, and the connection portion 86e is arranged on the optical waveguide 64. The conductive layers 86f and 86g are integrated at a connection portion 86h, and the connection portion 86h is arranged on the optical waveguide 64. In FIG. 19, the conductive layers 86a and 86c and the conductive layers 86f and 86g are respectively arranged symmetrically with respect to a horizontal line. The conductive layers 86a and 86f and the conductive layers 86c and 86g are respectively connected by thin control electrodes 36a and 36d. The control electrode 77 comprises a rectangular portion 77a and triangular portions 77b and 77c. The linear portions 64c are respectively arranged between the rectangular portion 77a and the control electrode 86b or between the rectangular portion 77a and the control electrode 86d. The triangular portion 77b is extended toward the Y-branch portion 64b, and the triangular portion 77c is extended toward the Y-branch portion 64d.

Figure 20:
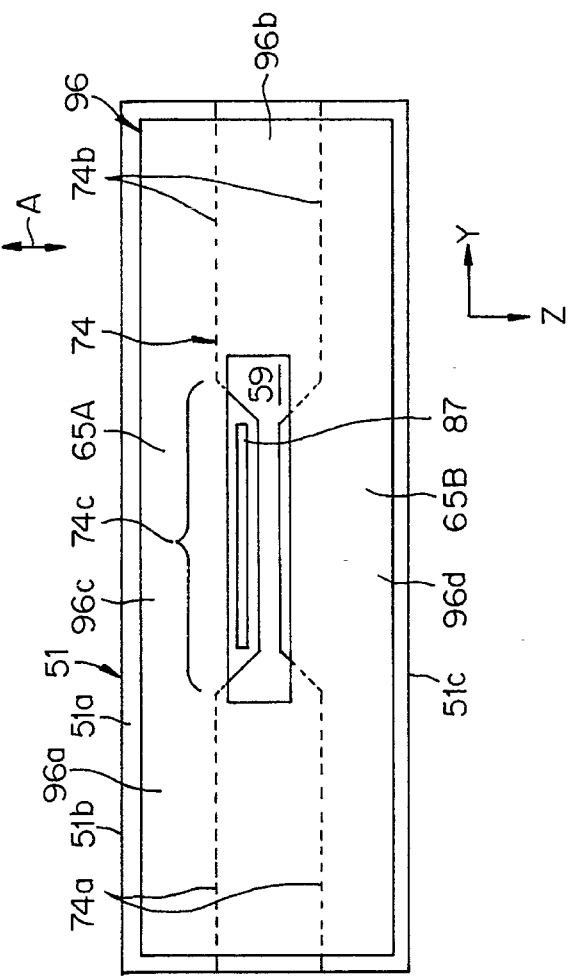
FIG. 20 is a plan view illustrating another embodiment of the optical waveguide device according to the second aspect of the invention.

FIG. 20 is a plan view showing one embodiment of a directional coupler according to the second aspect of the invention. In this embodiment, an optical waveguide 24 comprises a pair of linear portions 74a in a light input side, a pair of linear portions 74b in a light output side, and a directional coupler portion 74c. Almost all the major plane 51 without a rectangular region 59 including the directional coupler portion 74c is covered with a conductive layer 96. Since a stripe electrode 87 is formed in the rectangular region 59, the conductive layer 96 functions to act as the control electrode of the directional coupler.

Further, a shape of the conductive layer 96 will be explained. Outer shape of the conductive layer 96 corresponds to that of the major plane 51. Almost the entire region 65A extending from a boundary between the first crystal layer 51b and the major plane 51a to the directional coupler portion 74c is covered with a first conductive layer 96c. Almost the entire region 65B extending from a boundary between the second crystal plane 51c and the major plane 51a to the directional coupler portion 74c. In FIG. 20, the first conductive layer 46c and the second conductive layer 46d are integrated by connection portions 46a and 46b respectively.

Hereinafter, actual examples according to the second aspect of the invention will be explained.

EXAMPLE 2

The optical waveguide devices according to the examples of the second aspect of the invention and according to the comparative examples were manufactured. Then, properties as the phase modulator for use in fiber optics gyroscope were measured.

As for the optical waveguide devices according to the examples of the second aspect of the invention, use was made of the optical waveguide device having the construction shown in FIG. 15. The optical waveguide devices were manufactured in the following manner. At first, a disk-shape wafer made of $LiNbO_3$ having X-cut plane was prepared. The wafer had a diameter of 3 inches and a thickness of 1 mm. A titanium thin layer having a width of 3 µm and a thickness of 500 angstrom was formed on the wafer by using the photolithography technic, and a titanium component was diffused into the $LiNbO_3$ wafer by effecting a heat treatment such as 1000° C.×6 hours to form the titanium diffused optical waveguide 54.

After that, conductive layer 56 and the control electrode 57, both made of metal layers, were respectively formed by a spraying method and so on. Gap distances between the electrode 57 and the control electrodes 56b or 56d were 10 µm, and a length of the electrode 57 was 15 mm. From this wafer, the optical waveguide substrates 51 for one chip were cut out.

Figure 21A:
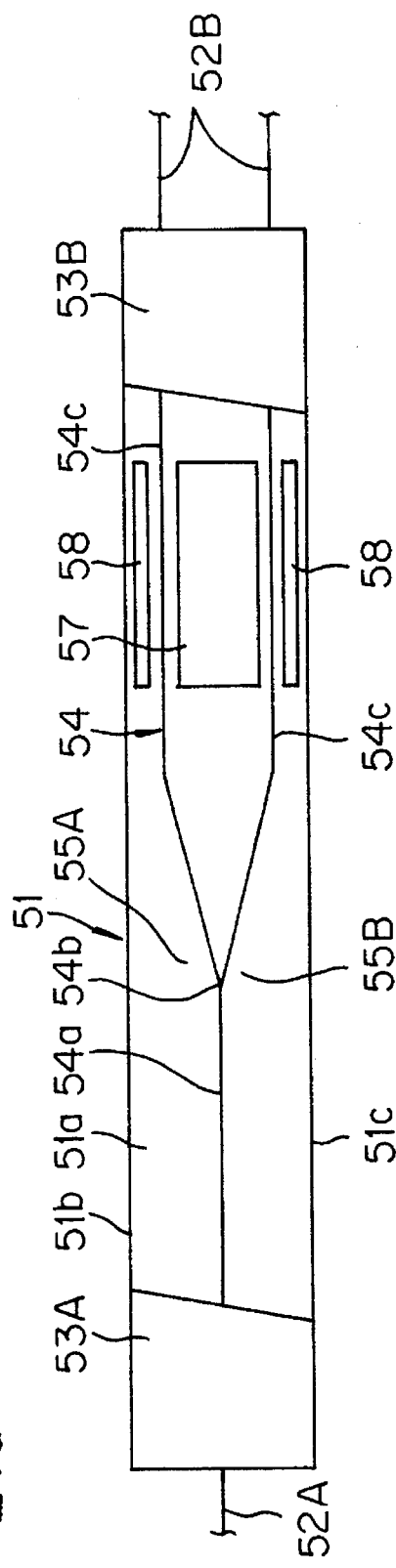
FIGS. 21a and 21b are plan views respectively depicting one embodiment of a conventional optical waveguide device.

To the both ends of the optical waveguide substrate 51, the optical fibers 52A and 52B were connected as shown in FIG. 15 to obtain specimens according to the second aspect of the invention. At the same time, the optical waveguide devices having a construction shown in FIG. 21a according to the comparative example were manufactured in the same manner as mentioned above. However, the specimens according to the comparative examples have electrodes 58 in spite of the conductive layer 56.

Then, the optical waveguide devices according to the examples of the second aspect of the invention and according to the comparative examples were accommodated in the temperature adjusting apparatus shown in FIG. 12. Then, a light having a wavelength of 0.85 µm was introduced from a light source, and output light transmitted through a pair of optical fibers 52B were measured by a pair of light amount measuring apparatuses. After that, a light insertion loss and a light dividing ratio were calculated from respective measured values.

Figure 22:
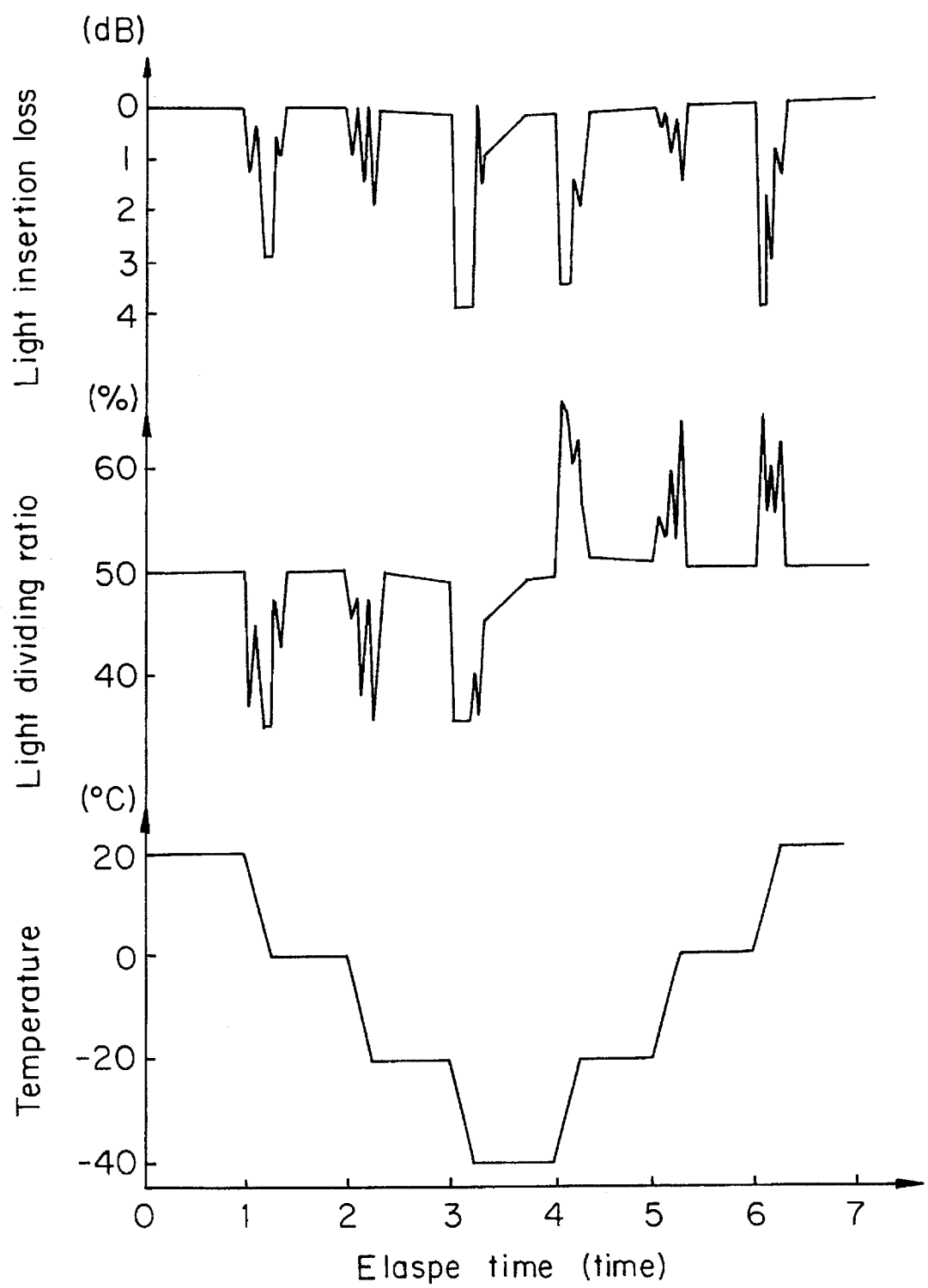
FIG. 22 is a graph showing a relation between the environmental temperature and the light insertion loss or the light dividing ratio in the comparative example.
Figure 23:
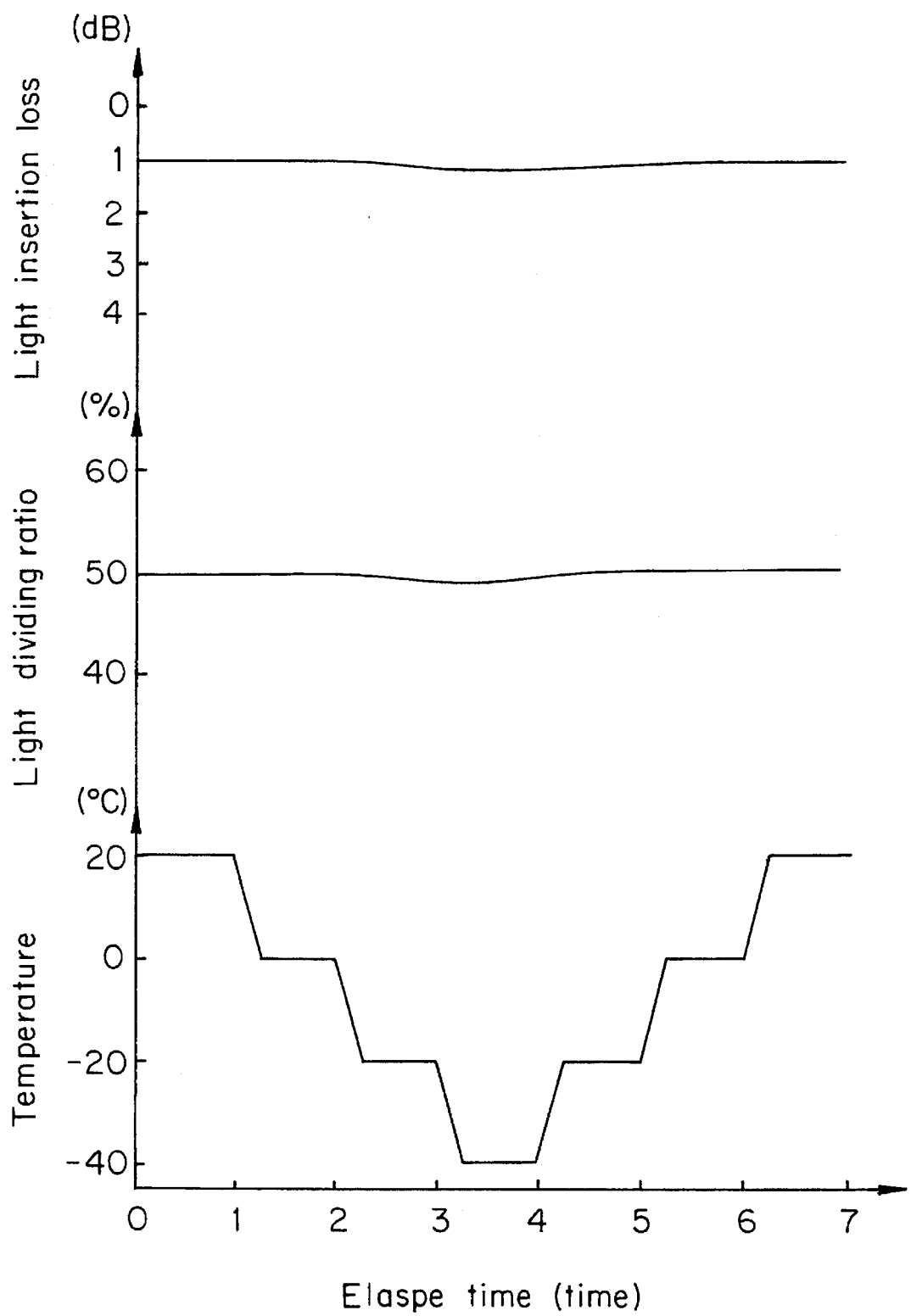
FIG. 23 is a graph illustrating a relation between the environmental temperature and the light insertion loss or the light dividing ratio in the embodiment according to the second aspect of the invention.

During this measuring operation, as shown in FIGS. 22 and 23, the environmental temperature of the optical waveguide devices were varied. That is to say, the environmental temperature was varied stepwise from 0° C. to −40° C. In this case, a holding time at respective temperatures was about 45 minutes, and an ascending rate and a descending rate of temperature was 80° C./hour.

As a result, FIG. 22 shows the results of the comparative example, and FIG. 23 shows the results of the example according to the first aspect of the invention. As shown in FIG. 22, in the comparative example, when the environmental temperature ascended or descended, both of the light insertion loss and the light dividing ratio were varied largely. It should be noted that, in FIG. 22, a region of the light insertion loss more 4 dB and a region of the light dividing ratio more than 30:70 were cut out. Contrary to this, in the example according to the first aspect of the invention, both of the light insertion loss and the light dividing ratio were not varied as shown in FIG. 23. In this case, a variation of the light insertion loss was less than 0.4 dB, and a variation of the light dividing ratio was in a range of 50:50–52:48.

Moreover, the optical waveguide devices according to the present invention and according to the comparative example were assembled in the fiber optics gyroscopes as modulators. Then, as shown in FIGS. 22 and 23, the environmental temperature was varied. As a result, in the comparative example, the calculated rotation angular rate was varied by more than 20%, and sometimes it was not possible to measure the rotation angular rate. In the example according to the first aspect of the invention, the calculated rotation angular rate was varied by 4%.

Further, the optical waveguide devices shown in FIGS. 16 and 17 were manufactured in the same manner mentioned above. Then, the same experiment was performed with respect to respective optical waveguide devices. As a result, the same results as those shown in FIG. 23 were obtained.

EXAMPLE 3

The optical waveguide devices according to the examples of the second aspect of the invention and according to the comparative examples were manufactured. Then, properties of the Mack-Zehnder light intensity modulator were measured. As for the optical waveguide devices according to the examples of the second aspect of the invention, use was made of the optical waveguide devices having the constructions shown in FIGS. 18 and 19.

The optical waveguide devices were manufactured in the following manner. At first, a disk-shaped wafer made of LiNbO$_3$ having X-cut plane was prepared. The wafer had a diameter of 3 inches and a thickness of 1 mm. A titanium thin layer having a width of 3 μm and a thickness of 500 angstrom was formed on the wafer by using the photolithography technic, and titanium component was diffused into the LiNbO$_3$ wafer by effecting a heat treatment such as 1000° C.×6 hours to form the titanium diffused optical waveguide 64.

After that, the conductive layers 56, 86 and the control electrodes 67, 77, both made of metal layers, were respectively formed by a spraying method and so on. Thicknesses of the conductive layers 56, 86 and the control electrodes 67, 77 were 2500 angstrom. From this wafer the optical waveguide substrates 51 for one chip were cut out.

Figure 21B:
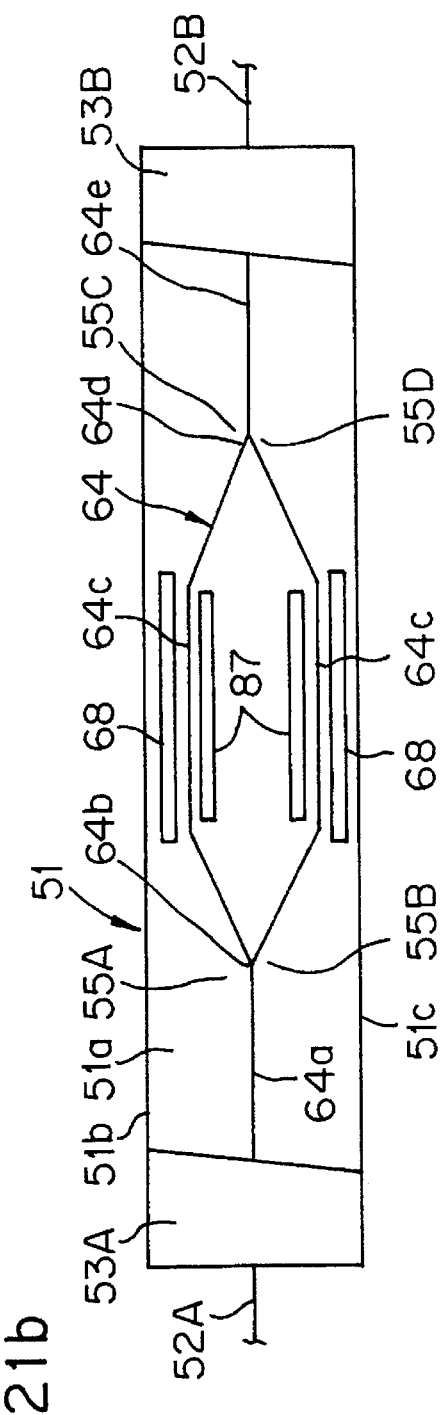

To the both ends of the optical waveguide substrate 51, the optical fibers 52A and 52B were connected as shown in FIGS. 18 and 19 to obtain specimens according to the second aspect of the invention. At the same time, the optical waveguide devices having a construction shown in FIG. 21b according to the comparative example were manufactured in the same manner as mentioned above. However, the specimens according to the comparative example have electrodes 18 and 37 in spite of the conductive layers 56, 86 and the control electrodes 67, 77.

Then, the optical waveguide devices according to the examples of the second aspect of the invention and according to the comparative examples were accommodated in the temperature adjusting apparatus shown in FIG. 12. Then, a light having a wavelength of 0.85 μm was introduced from a light source, and output lights transmitted through a pair of optical fibers 52B were measured by a pair of light amount adjusting apparatuses. After that, a light insertion loss and a light extinction ratio in a temperature stable state (−20° C.) were measured. Moreover, the light insertion loss and the light extinction ratio were measured when a temperature was varied at a rate of 80° C./hour.

Figure 24:
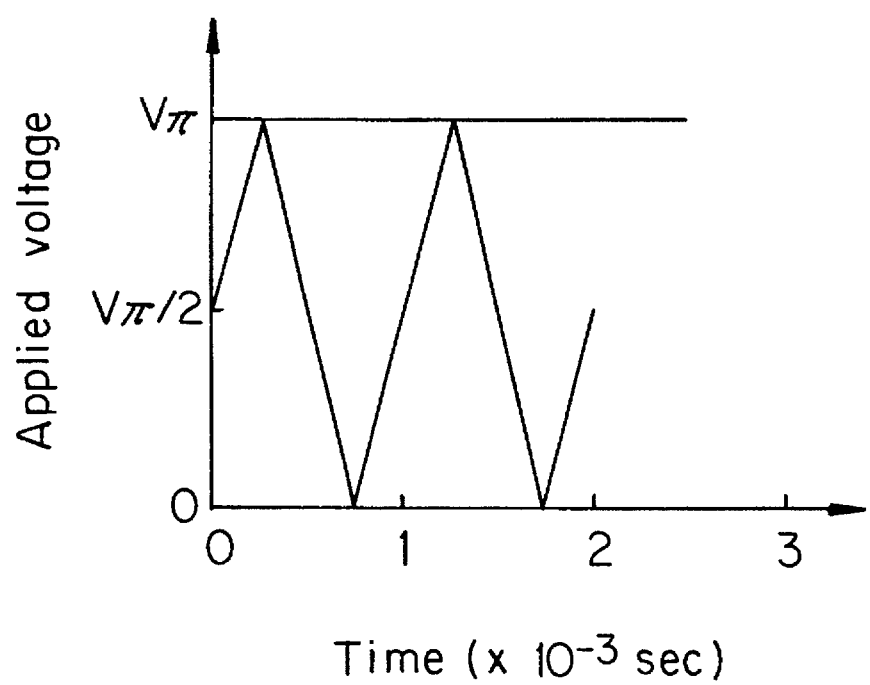
FIG. 24 is a graph depicting a relation between applied voltage and time.

In the measurement of the light extinction ratio, an applied voltage was varied reciprocally as shown in FIG. 24. In FIG. 24, Vπ means 5 V. As a result, in the specimen according to the comparative example shown in 21b, a light intensity was varied as shown in FIG. 2a in response to the temperature variation. In this case, a light intensity had an arbitrary unit. This light extinction ratio was 0.6 dB. Moreover, the light insertion loss in a temperature variable state was increased by 3 dB as compared with that in a temperature stable state.

Figure 25A:
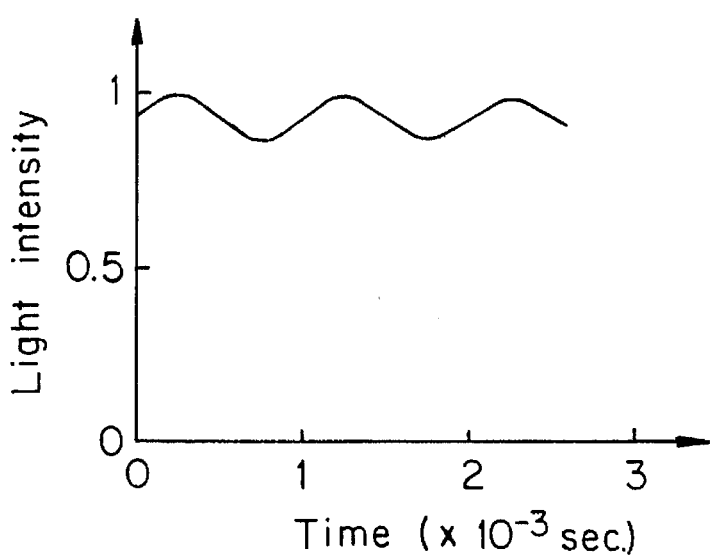
FIGS. 25a, 25b and 25c are graphs respectively showing a relation between light intensity and time in the optical waveguide device according to the second aspect of the invention.
Figure 25B:
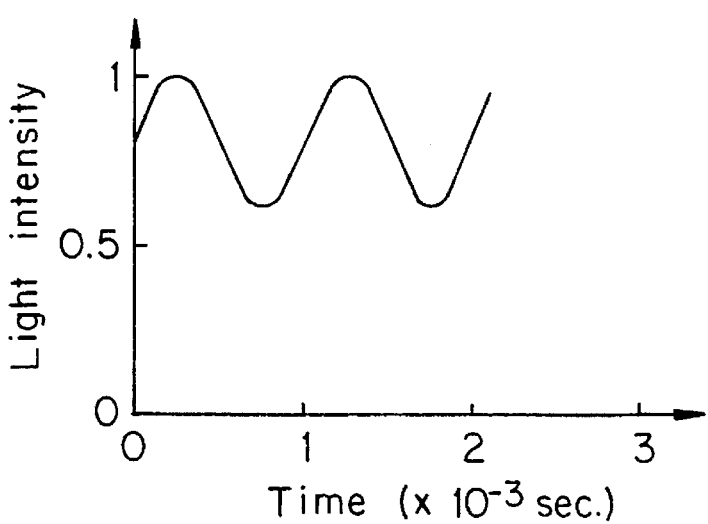

In the embodiment shown in FIG. 18, the light intensity in a temperature variable state was varied as shown in FIG. 25b. This light extinction ratio was 2dB. Moreover, the light insertion loss in a temperature variable state was increased by 3 dB as compared with that in a temperature stable state. In this manner, if the conductive layers 56a, 56c were arranged around the Y-branch portion 64b, the light extinction ratio in a temperature variable state can be extraordinarily improved.

Figure 25C:
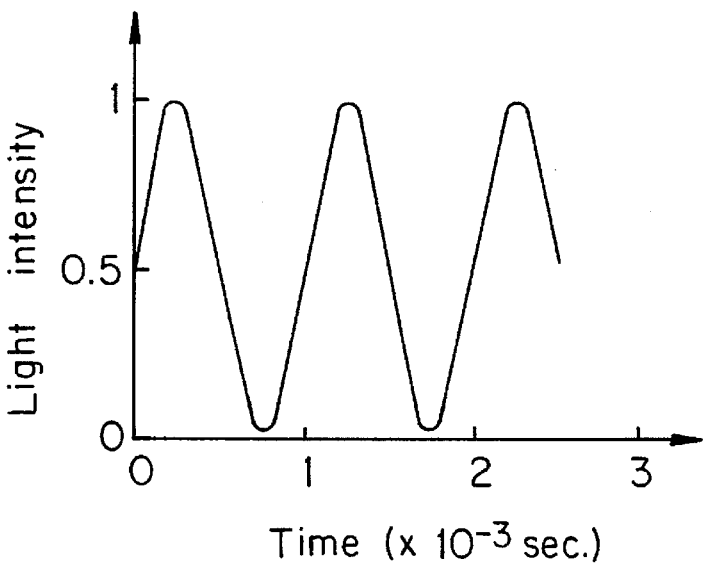

In the embodiment shown in FIG. 19, the light intensity in a temperature variable state was varied as shown in FIG. 25c. This light extinction ratio was 20 dB. Moreover, the light insertion loss in a temperature variable state was increased by only less than 0.1 dB as compared with that in a temperature stable state. In this manner, if the conductive layers 86a, 86c, 86f, 86g were arranged around the Y-branch portions 64b and 64d, both of the light extinction ratio and the light insertion loss in a temperature variable state can be extraordinarily improved.

Figure 26:
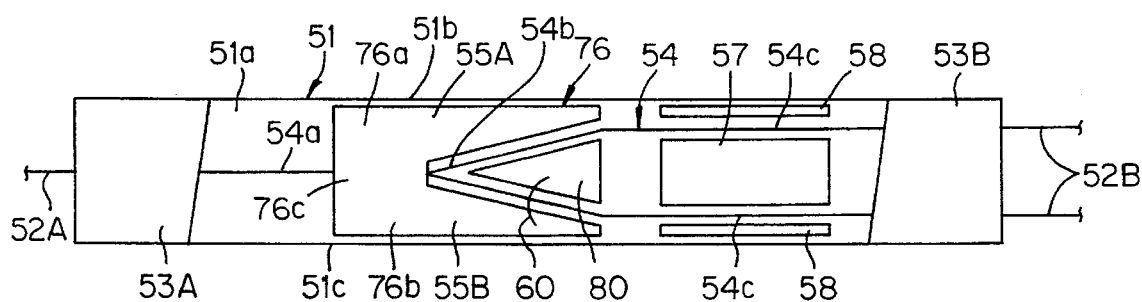
FIG. 26 is a plan view illustrating another embodiment of the optical waveguide device according to the second aspect of the invention.

FIG. 26 is a plan view showing another embodiment of the optical waveguide device according to the second aspect of the invention, which relates to the optical waveguide substrate having Y-branch portions shown in FIGS. 15 to 17. In the embodiment shown in FIG. 26, a conductive layer 76 is isolated from a pair of the control electrodes 58, and does not function to apply a voltage. The linear portions 54c in a light output side are arranged respectively between the control electrode 57 and the control electrode 58. The integrated conductive layer 76 comprises a first conductive layer 76a, a second conductive layer 76b and a connection portion 76c. The conductive layers 76a, 76b have a rectangular shape. Outer sides of the conductive layers 76a, 76b are linear along a boundary between the major plane 51a and respective crystal planes. Inner sides of the conductive layers 76a, 76b are along a shape of the optical waveguide. The connection portion 76c is arranged on the optical waveguide 54. In an inner portion of the Y-branch portion 54b, a third conductive layer 80 having a triangular shape is formed, and the third conductive layer 80 and the second conductive layer 76b are electrically conducted by means of the connection member 60. The third conductive layer 80 and the control electrode 57 are isolated.

EXAMPLE 4

The optical waveguide device show in FIG. 26 was manufactured, and the same experiments as those of the example 2 were performed. As is the same as the example 2, the titanium diffused optical waveguide 54 was formed in the optical waveguide substrate 51 by using a titanium diffusing method.

After that, the conductive layers 76, 80 and the control electrodes 57, 58, both made of metal layers, were formed by a spraying method and so on. Thicknesses of the conductive layers 76, 80 and the control electrodes 57, 58 were 2500 angstrom. A gap distance between the control electrodes 57 and 58 was 10 μm, and a length of respective control electrodes was 15 mm. From this wafer, the optical waveguide substrates 51 for one chip were cut out. To both ends of the optical waveguide substrate 51, the optical fibers 52A, 52B are connected as shown in FIG. 26 to obtain the specimens.

The thus obtained optical waveguide device shown in FIG. 2 was accommodated in the temperature adjusting apparatus. Then a light having a wavelength of 0.85 μm was introduced from the light source, and output lights transmitted through a pair of optical fibers 2B were measured by a pair of light amount measuring apparatuses. After that, a light insertion loss and a light dividing ratio were calculated from respective measured values.

Figure 27:
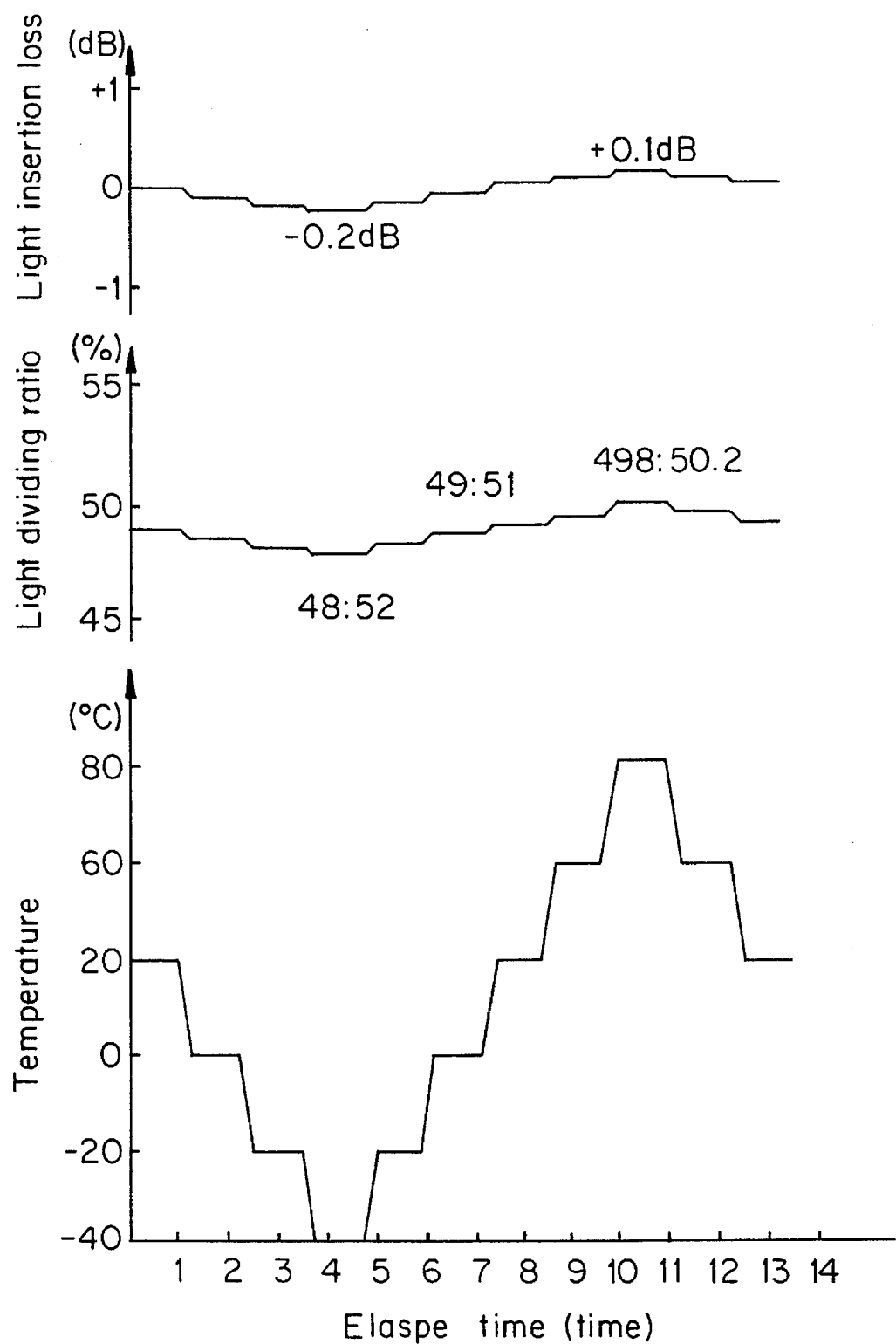
FIG. 27 is a graph depicting a relation between the environmental temperature and the light insertion loss or the light dividing ratio in the embodiment shown in FIG. 12.

During this measuring operation, as shown in FIG. 27, the environmental temperature of the optical waveguide devices were varied. That is to say, the environmental temperature was varied stepwise from 80° C. to −40° C. In this case, a holding time at respective temperature was about 45 minutes, and an ascending rate and a descending rate of temperature was 80° C./hour.

As a result, as shown in FIG. 27, both of the light insertion loss and the light dividing ratio were not varied. That is to say, in a wide temperature range of −40° C.~80° C., a variation of the light insertion loss was 0.3 dB and a variation of the light dividing ratio was in a range of 48:52~49.8:50.2. Especially, in a temperature range of −40° C.~20° C., a variation of the light insertion loss was less than 0.2 dB, and a variation of the light dividing ratio was in a range of 48:52~49:51.

As mentioned above, according to the second aspect of the invention, it is possible to obtain the optical waveguide device showing no variations of the light insertion loss, the light dividing ratio and the light extinction ratio at functional portions in the optical waveguide even if the environmental temperature is varied.

What is claimed is:

1. An optical waveguide device, comprising:

at least one optical waveguide substrate comprising ferroelectric crystals, said optical waveguide substrate having an optical waveguide formed therein, and a conductive layer formed therein along a crystal plane, wherein charges of a first polarity are generated along said crystal plane of said optical waveguide substrate due to pyroelectrical effects; and at least one dummy substrate comprising ferroelectric crystals, said dummy substrate being spaced apart from said optical waveguide substrate and having a conductive layer formed therein along a crystal plane, wherein charges of a second polarity opposite said first polarity are generated along said crystal plane of said dummy substrate due to pyroelectrical effects, and the conductive layers are electrically connected to each other such that the conductive layers are held at substantially the same potential.

2. The optical waveguide device of claim 1, wherein said optical waveguide substrate and said dummy substrate are stacked together such that the crystal planes are coplanar.

3. The optical waveguide device of claim 2, further comprising an adhesive layer provided between said optical waveguide substrate and said dummy substrate.

4. The optical waveguide device of claim 1, comprising a plurality of optical waveguide substrates, each respective first conductive layer of said optical waveguide substrates being electrically connected to said conductive layer of said dummy substrate.

5. The optical waveguide device of claim 4, wherein said dummy substrate is arranged between two optical waveguide substrates such that the crystal planes of said two optical waveguide substrates and the crystal plane of said dummy substrate are coplanar.

6. An optical waveguide device, comprising:

a first optical waveguide substrate comprising ferroelectric crystals, said optical waveguide substrate having an optical waveguide formed therein, and a conductive layer formed therein along a crystal plane, wherein charges of a first polarity are generated along said crystal plane of said first optical waveguide substrate due to pyroelectrical effects; and a second optical waveguide substrate stacked together with said first optical waveguide substrate, said second optical waveguide substrate comprising ferroelectric crystals and having an optical waveguide formed therein and a conductive layer formed therein along a crystal plane, wherein charges of a second polarity opposite said first polarity are generated along said crystal plane of said second optical waveguide substrate due to pyroelectrical effects, said conductive layers are electrically connected to each other such that said conductive layers are held at substantially the same potential, and said crystal planes are coplanar.

7. An optical waveguide device, comprising:

an optical waveguide substrate comprising ferroelectric crystals having a spontaneous electric polarization direction, said optical waveguide substrate having first and second crystal planes formed therein, charges of first and second opposite polarities being generated along said first and second crystal planes, respectively, due to pyroelectrical effects;

an optical waveguide formed in said optical waveguide substrate through which light propagates along a propagation direction, said optical waveguide including a functional portion for dividing or coupling light passing therethrough;

a first conductive layer formed on said optical waveguide substrate along a first region extending from said first crystal plane to said functional portion; and a second conductive layer formed on said optical waveguide substrate along a second region extending from said second crystal plane to said functional portion, wherein said first conductive layer and said second conductive layer are electrically connected to each other such that said first and second conductive layers are held at substantially the same potential, and said spontaneous electric polarization direction and said propagation direction are transverse with each other.

8. The optical waveguide device of claim 7, wherein said functional portion divides light passing therethrough along first and second light paths, said optical waveguide device further comprises a third conductive layer provided on said optical waveguide substrate between first and second light paths, and at least one of said first and second conductive layers is connected to said third conductive layer.

9. The optical waveguide device of claim 8, further comprising first and second control electrodes, wherein said first light path extends between a first control electrode and said third conductive layer, and said second light path passes between a second control electrode and said third conductive layer.

10. The optical waveguide device of claim 7, wherein said first and second conductive layers are electrically connected to each other via wires or conductive strips.

11. The optical waveguide device of claim 7, wherein said first and second conductive layers are integrated with each other.

12. The optical waveguide device of claim 7, wherein said functional portion divides light passing therethrough along first and second light paths, said optical waveguide device further comprising first, second and third control electrodes, wherein said first light path extends between the first control electrode the second control electrode, and said second light path extends between the second control electrode and the third control electrode, said first and second conductive layers being electrically connected to said first and third control electrodes, respectively.

13. The optical waveguide device of claim 7, wherein said functional portion divides light passing therethrough along first and second light paths, said optical waveguide device further comprising first, second and third control electrodes, wherein said first light path extends between the first control electrode the second control electrode, and said second light path extends between the second control electrode and the third control electrode, said first and second conductive layers being electrically isolated from said first and third control electrodes, respectively.

14. The optical waveguide device of claim 7, wherein said functional portion comprises a Y-branch portion or a directional coupler.

* * * * *